US012805989B2

(12) United States Patent
Xu

(10) Patent No.: US 12,805,989 B2
(45) Date of Patent: Nov. 24, 2026

(54) DENTAL FLOSSER WITH MEANS FOR ADJUSTING FLOSS TENSION

(71) Applicant: Meng Xu, West Vancouver (CA)

(72) Inventor: Meng Xu, West Vancouver (CA)

( * ) Notice: Subject to any disclaimer, the term of this patent is extended or adjusted under 35 U.S.C. 154(b) by 0 days.

(21) Appl. No.: 18/637,926

(22) Filed: Apr. 17, 2024

(65) Prior Publication Data

US 2024/0261071 A1 Aug. 8, 2024

Related U.S. Application Data

(63) Continuation-in-part of application No. 16/545,739, filed on Aug. 20, 2019, now Pat. No. 11,963,834.

(51) Int. Cl.
*A61C 15/04* (2006.01)

(52) U.S. Cl.
CPC .......... *A61C 15/046* (2013.01); *A61C 15/048* (2013.01)

(58) Field of Classification Search
CPC ............................ A61C 15/046; A61C 15/048
USPC ............................................................ D1/106
See application file for complete search history.

(56) References Cited

U.S. PATENT DOCUMENTS 1,512,633 A 10/1924 Peckham
2,873,749 A * 2/1959 Gjerde ................. A61C 15/046 132/327
3,236,247 A 2/1966 Brockman
3,519,004 A * 7/1970 Foster .................. A61C 15/046 132/325
3,886,956 A * 6/1975 Cash .................... A61C 15/046 132/325
3,993,085 A 11/1976 Skinner
4,655,233 A 4/1987 Laughlin
4,832,062 A 5/1989 Grollimund
5,113,880 A 5/1992 Honda
(Continued)

FOREIGN PATENT DOCUMENTS

CN 204814248 U 12/2015

OTHER PUBLICATIONS

Office Action issued on Jul. 21, 2022—U.S. Appl. No. 16/545,739.
Office Action issued on Sep. 2, 2022—U.S. Appl. No. 16/545,739.
Office Action issued on Dec. 6, 2022—U.S. Appl. No. 16/545,739.
(Continued)

*Primary Examiner* — Nicholas D Lucchesi
*Assistant Examiner* — Jennifer Gill
(74) *Attorney, Agent, or Firm* — Jeffer Mangels & Mitchell LLP; Brennan C. Swain, Esq.

(57) ABSTRACT

A dental flosser that includes a U-shaped portion having a first arm and a second arm spaced apart from each other and the second arm including a channel defined therethrough, a handle portion that extends from the U-shaped portion, a floss strand attachment member associated with and movable with respect to the handle portion between at least a first position and a second position toward the proximal end of the handle portion to increase the tension of the floss strand, and a floss strand having a length and a first end and a second end. The floss strand attachment member includes a contact member that is pivotable between an engaged position and a disengaged position. The first end of the floss strand is fastened to the first arm, the second end of the floss strand is attached to the floss strand attachment member and a middle portion of the floss strand extends through the channel such that a portion of the floss strand extends between the first and second arms.

12 Claims, 36 Drawing Sheets

(56) References Cited

U.S. PATENT DOCUMENTS

| | | | | |
|---|---|---|---|---|
| 5,139,038 | A * | 8/1992 | El Gazayerli | A61C 15/046 132/324 |
| 5,183,064 | A | 2/1993 | Barth | |
| 5,305,768 | A | 4/1994 | Gross | |
| 6,155,274 | A | 12/2000 | Stein | |
| 7,104,266 | B2 * | 9/2006 | Lee | A61C 15/046 132/323 |
| 8,893,733 | B2 | 11/2014 | Welt | |
| 2012/0180809 | A1 | 7/2012 | Bai | |
| 2012/0279518 | A1 | 11/2012 | Alas | |
| 2015/0059791 | A1 | 3/2015 | Sheppel | |
| 2016/0067021 | A1 | 3/2016 | Zwimpfer | |
| 2018/0140397 | A1 | 5/2018 | Kozak | |
| 2019/0175318 | A1 * | 6/2019 | Oh | A61C 15/046 |

OTHER PUBLICATIONS

Office Action issued on Jun. 2, 2023—U.S. Appl. No. 16/545,739.
Office Action issued on Sep. 13, 2023—U.S. Appl. No. 16/545,739.
Office Action issued on Nov. 21, 2023—U.S. Appl. No. 16/545,739.
Response to Office Action issued on Jul. 21, 2022 (Response to Restriction Requirement)—U.S. Appl. No. 16/545,739.
Response to Office Action issued on Sep. 2, 2022—U.S. Appl. No. 16/545,739.
Response to Office Action issued on Dec. 6, 2022—U.S. Appl. No. 16/545,739.
Response to Office Action issued on Jun. 2, 2023—U.S. Appl. No. 16/545,739.
Response to Office Action issued on Sep. 13, 2023—U.S. Appl. No. 16/545,739.
Request for Continued Examination and Amendment filed Nov. 16, 2023.

* cited by examiner

DENTAL FLOSSER WITH MEANS FOR ADJUSTING FLOSS TENSION

CROSS REFERENCE TO RELATED APPLICATIONS

This application is a continuation-in-part of U.S. patent application Ser. No. 16/545,739, filed Aug. 20, 2019, the entirety of which is incorporated by reference herein.

FIELD OF THE INVENTION

The present invention relates in general to dental and oral cleaning devices and in particular to hand-held dental flossers (e.g., dental floss picks or dental floss holders) with means for adjusting floss tension, and to methods for making and using such dental flossers.

BACKGROUND OF THE INVENTION

The spaces between teeth and the surfaces of teeth in general can be cleaned by a variety of methods including brushing, machine-driven jets of water, toothpicks and the like, and by flossing with dental floss or dental tape or similar thread. Dental floss is a cord of thin filaments generally used to remove food and dental plaque from teeth.

One of the chief causes of caries (dental cavities) and a principal cause of periodontal (gum and root) disease is bacterial plaque formation that develops on tooth surfaces. When removed, new plaque can reform in less than 24 hours. Therefore, in order to maintain optimal dental hygiene and health, flossing should be carried out at least once per day.

Many people do not floss their teeth on a daily basis, because the manual procedure for using conventional dental floss is difficult and tedious. The use of a hand-held dental flosser (also known as a floss holder or a floss pick) has made flossing more convenient and less difficult. A dental flosser generally comprises two prongs extending from a thin plastic body (or handle). A floss strand runs between the two prongs. As an example, a conventional dental flosser is disclosed in United States Design Pat. No. D618396 entitled "Dental floss pick". Conventional dental flossers are usually made of a rigid and inflexible plastic material, and the tension of the floss strand between the two prongs is fixed.

A major shortcoming of conventional dental flossers is that the tension in the floss strand is fixed, so that the relatively high tension required to enable proper insertion of the floss strand between the teeth, which action requires the floss strand to remain tense, does not allow the floss strand to curve around the profile of the tooth away from the interdental space. As a consequence, proper cleaning of plaque and bacteria from surfaces of the teeth other than interdental surfaces is not readily performed.

Therefore, it is desirable to provide an improved hand-held dental flosser with means for adjusting floss tension and which is more effective for cleaning the tooth surfaces around the profile of the tooth (including the front surface, the back surface, and the interdental surface of the tooth).

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with an aspect of the present invention there is provided a dental flosser that includes a U-shaped portion having a first arm and a second arm spaced apart from each other and the second arm including a channel defined therethrough, a handle portion that extends from the U-shaped portion, a floss strand attachment member associated with and movable with respect to the handle portion between at least a first position and a second position toward the proximal end of the handle portion to increase the tension of the floss strand, and a floss strand having a length and a first end and a second end. The floss strand attachment member includes a contact member that is pivotable between an engaged position and a disengaged position. The first end of the floss strand is fastened to the first arm, the second end of the floss strand is attached to the floss strand attachment member and a middle portion of the floss strand extends through the channel such that a portion of the floss strand extends between the first and second arms.

The handle portion may include a slot defined therethrough. The floss strand attachment member may include the contact member and a male member extending from the contact member and at least a portion of the male member may extend into the slot. The male member may include a living hinge and the contact member may be pivotable about the living hinge between the engaged position and the disengaged position.

Preferably, the handle portion and the U-shaped portion are co-planar and define a first plane that bifurcates the handle portion and the U-shaped portion. However, this is not a limitation and the handle portion and U-shaped portion may not be co-planar. The male member defines a first axis, the male member includes a first end that is attached to the contact member and a second end opposite the contact member, and the second end of the male member may extend into the slot and through the first plane such that the first axis is perpendicular to the first plane while the contact member is located outside the slot. The handle portion may include at least a first tooth extending outwardly therefrom that defines a first height. The contact member includes or defines a contact surface that is movable a second height between the engaged position and the disengaged position, where the second height is greater than the first height.

The first tooth may be part of a first set of teeth that includes the first tooth and a second tooth. The first tooth is positioned on a first side of the slot and the second tooth is positioned on a second side of the slot. When the floss strand attachment member is moved from the first position to the second position (to increase tension), a curved or inclined surface on the contact member moves up and over a complementary curved or inclined surface on the first tooth. In a preferred embodiment, the first set of teeth extends outwardly from the first side surface of the flosser and a second set of teeth extend outwardly from the second side surface.

In accordance with another aspect of the present invention there is provided a method of flossing comprising the steps of obtaining a dental flosser that includes a U-shaped portion having a first arm and a second arm spaced apart from each other, a handle portion that extends from the U-shaped portion, where the handle portion includes a proximal end and a distal end, where the proximal end is distant from the U-shaped portion, where the second arm includes a channel defined therethrough, a floss strand attachment member associated with and movable with respect to the handle portion, where the floss strand attachment member includes a contact member that is pivotable between an engaged position and a disengaged position, where the contact member includes a contact surface that contacts the handle portion in the engaged position, and a floss strand having a length and a first end and a second end, where the first end of the floss strand is fastened to the first arm and the second end of the floss strand is attached to the floss strand attachment member, where a middle portion of the floss strand extends through the channel such that a portion of the floss strand extends between the first and second arms. The method also includes pivoting the contact member from the engaged position to the disengaged position, and moving the floss strand attachment member along the handle to increase or decrease the tension on the floss strand.

In a preferred embodiment, when the floss strand attachment member is moved along the handle to increase the tension on the floss strand, a curved or inclined surface on the contact member moves up and over a complementary curved or inclined surface on the first tooth. The step of pivoting the contact member from the engaged position to the disengaged position may include pushing inwardly on a proximal end of the contact member.

In accordance with another aspect of the present invention there is provided a dental flosser that includes a U-shaped portion having a first arm and a second arm spaced apart from each other, where the second arm includes a channel defined therethrough, a handle portion that extends from the U-shaped portion, where the handle portion includes first and second opposing side surfaces, a distal end and a proximal end that is distant from the U-shaped portion, and where the handle portion includes at least a first tooth extending outwardly therefrom, wherein the first tooth defines a first height. The flosser also includes a floss strand attachment member associated with and movable with respect to the handle portion between at least a first position and a second position toward the proximal end of the handle portion to increase the tension of the floss strand. The floss strand attachment member may include a contact member having at least a first arm extending therefrom toward the handle portion. The contact member and first arm are movable between a disengaged position and an engaged position. The first arm includes a contact surface at a distal end thereof. A second height is defined between the contact surface and the first side surface of the handle portion when the first arm is in the disengaged position. The second height may be greater than the first height. However, the second height is less than the first height when the first arm is moved to the engaged position. The flosser also includes a floss strand having a length and a first end and a second end, where the first end of the floss strand is fastened to the first arm and the second end of the floss strand is attached to the floss strand attachment member, a middle portion of the floss strand extends through the channel such that a portion of the floss strand extends between the first and second arms.

In a preferred embodiment, the contact member and first arm may be pivotable about a living hinge between the disengaged position and the engaged position. The handle portion may include a first row of teeth extending outwardly from the handle portion and a second row of teeth extending outwardly from the handle portion. The floss strand attachment member may include the first arm and a second arm. The first arm may be aligned with the first row of teeth and the second arm may be aligned with the second row of teeth.

In accordance with another aspect of the present invention there is provided a dental flosser that includes a U-shaped portion having a first arm and a second arm spaced apart from each other, with the second arm including a channel defined therethrough, a handle portion associated with the U-shaped portion, a rotation assembly that includes a rotation mechanism and a receiver portion, and a floss strand. The rotation mechanism may include a spool portion and an axle portion. The receiver portion may include a rotation opening defined in the handle portion and an engagement seat surrounding the rotation opening. The engagement seat may include a plurality of circularly arranged recesses defined therein or at least a first recess. The axle may be rotatably received in the rotation opening. The rotation mechanism may include an engagement flange extending radially outwardly therefrom (or from the axle portion). The engagement flange may include a plurality of protrusions (e.g., first and second protrusions) extending therefrom. Each one of the plurality of protrusions may be received in one of the recesses defined in the engagement seat. The floss strand may have a first end fastened to the first arm and a second end of attached to the spool portion of the rotation mechanism. The middle portion of the floss strand extends through the channel such that a portion of the floss strand extends between the first and second arms. The rotation mechanism is rotatable from a first position to a second position to increase the tension on the floss strand.

In accordance with another aspect of the present invention there is provided a method of using a dental flosser that includes obtaining the dental flosser that includes a U-shaped portion having a first arm and a second arm spaced apart from each other, where the second arm includes a channel defined therethrough, a handle portion associated with the U-shaped portion, a floss strand having a length and a first end and a second end, the first end of the floss strand is fastened to the first arm and the second end of the floss strand is attached to a rotation mechanism that is rotatably mounted on the handle portion, and a middle portion of the floss strand extends through the channel such that a portion of the floss strand extends between the first and second arms. The method also includes rotating the rotation mechanism from a first position to a second position to increase the tension on the floss strand.

In accordance with another aspect of the present invention there is provided a dental flosser that includes a U-shaped portion having a first arm and a second arm spaced apart from each other. The U-shaped portion includes opposing first and second side surfaces. The second arm includes a channel defined therethrough. The second arm includes a main portion and an end portion. The channel is defined between the main portion and the end portion. A first prong member may extend between the main portion and the end portion and includes an inner surface that at least partially defines a first side of the channel. A second prong member may extend between the main portion and the end portion and includes an inner surface that at least partially defines a second side of the channel. The second arm defines a width, and the inner surface of the first prong member and the inner surface of the second prong member oppose one another along no more than about 10% of the width. The flosser also includes a handle portion which extends from the U-shaped portion. The handle portion includes a proximal end and a distal end, and the proximal end is distant from the U-shaped portion. The flosser includes a floss strand and a floss strand attachment member associated with and movable with respect to the handle portion between at least a first position and a second position toward the proximal end of the handle portion to increase the tension of the floss strand. The floss strand has a length and a first end and a second end, where the first end of the floss strand is fastened to the first arm and the second end of the floss strand is attached to the floss strand attachment member. The middle portion of the floss strand extends through the channel such that a portion of the floss strand extends between the first and second arms, and the first prong member is located on a first side of the floss strand and the second prong member is located on a second side of the floss strand that is opposite the first side.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
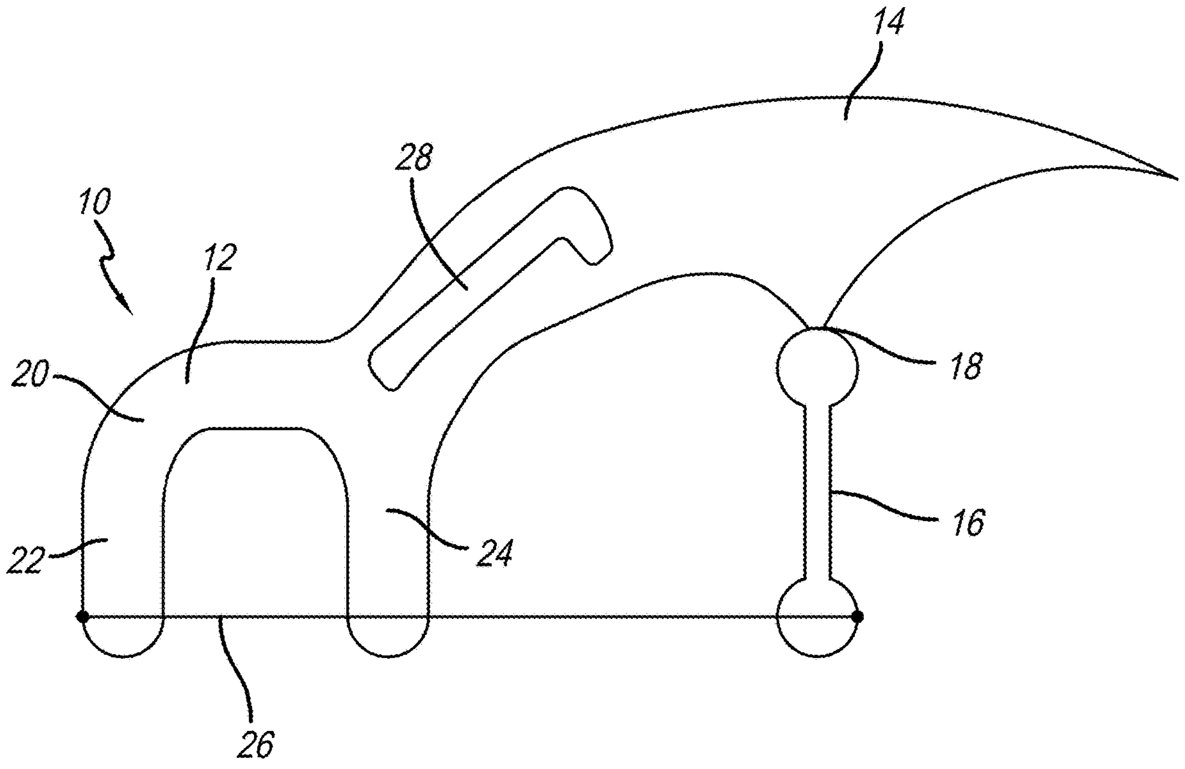
FIG. 1 shows a side view of a dental flosser according to an example embodiment of the invention, wherein a slide member portion is detachably connected to a handle portion of the dental flosser.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

One aspect of the invention relates to a hand-held dental flosser. The dental flosser comprises a U-shaped portion which has two spaced-apart arms (a first arm and a second arm), and a handle portion connected to the U-shaped portion. The dental flosser also comprises a floss strand. The floss strand comprises a first terminal end and a second terminal end. The first terminal end of the floss strand is fixedly attached to the first arm of the U-shaped portion such that the position of the first terminal end of the floss strand does not move relative to the first arm of the U-shaped portion. The location of this attachment may be at or near the end of the first arm of the U-shaped portion. The second terminal end of the floss strand is attached to a floss strand attachment piece. A user can manipulate the floss strand attachment piece either manually (or mechanically or electronically) to move the second terminal end of the floss strand to increase or decrease or maintain tension of the floss strand. A middle portion of the floss strand is slideably mounted on the second arm of the U-shaped portion such that a middle portion of the floss strand can slide relative to the second arm of the U-shaped portion. A number of possible mounting mechanisms may be employed to enable a middle portion of the floss strand to be slideably mounted on the second arm of the U-shaped portion, such as a fixed pulley, a pivot, a wheel, a rotor, a channel, a passageway, a hole, or some other suitable means. The location of the mounting mechanism may be at or near the end of the second arm of the U-shaped portion. The mounting mechanism prevents the floss strand from getting completely detached from the second arm of the U-shaped portion, but allows the floss strand to slide.

One aspect of the invention relates to a hand-held dental flosser. The dental flosser comprises a U-shaped portion which has two spaced-apart arms, a handle portion connected to the U-shaped portion, and a slide member portion separate from or detachably connected to the handle portion (or the U-shaped portion). In some embodiments, the U-shaped portion, the handle portion and the slide member portion are all made of a same suitable material (such as plastic) and are manufactured using an injection molding process. In some embodiments, the dental flosser is manufactured as a one-piece product, having the U-shaped portion, the handle portion and the slide member portion connected together. The slide member portion may be connected to either the handle portion or the U-shaped portion at a narrow connecting point, and a user can apply force at the narrow connecting point to break the slide member portion apart from the handle portion or the U-shaped portion so that the slide member becomes a separate component.

The dental flosser also comprises a floss strand. In some embodiments, the floss strand is injection molded with the dental flosser in situ. The floss strand has two ends. The first end of the floss strand is fastened to and embedded in the first arm of the U-shaped portion (i.e., the arm distal to the handle portion). The second end of the floss strand is fastened to and embedded in the slide member. There are a number of methods to securely fasten the ends of the floss strand. One example method is to let the end of the floss strand to extend out from the plastic during the injection molding process and to heat or burn the floss strand ends to coalesce into beads of diameter greater than the floss, which prevents the floss strand from being pulled out from the plastic.

A middle section of the floss strand passes through a channel inside the second arm of the U-shaped portion. This channel is created when the floss strand is injection molded with the dental flosser in situ. The middle section of the floss strand can slide inside the channel inside the second arm of the U-shaped portion.

The floss strand has three contact points (or contact regions) with the dental flosser. The floss strand has a first end which is fastened to the first arm of the U-shaped portion. This is the first contact point. The floss strand has a second end which is fastened to the slide member. This is the second contact point. Between its first end and its second end, the floss strand also contacts the second arm of the U-shaped portion by passing through the channel or some other mounting mechanism in the second arm of the U-shaped portion. This is the third contact point. In this sense, the function of the second arm of the U-shaped portion with respect to the floss strand is similar to a fixed pulley which enables the floss strand to be mounted on it and slide around it. The length of the floss strand between its two ends is fixed. However, the portion of the floss strand between the first and second arms of the U-shaped portion is adjustable by the user.

One aspect of the invention relates to a method of using the hand-held dental flossers as disclosed herein. If the floss strand attachment piece (e.g., the slide member portion) is connected to the handle portion of the dental flosser, a user can first break the slide member portion apart from the dental flosser. The user can then pull or hold the floss strand piece to increase or maintain the tension of the floss strand between the first and second arms of the U-shaped portion. Alternatively, the user can attach the floss strand attachment piece to a mechanical or electrical mechanism to increase or maintain the tension of the floss strand. When the floss strand is in tension, the user can maneuver the dental flosser to insert the floss strand between two adjacent teeth. Once the floss strand is inserted in the interdental space, the user can decrease the tension of the floss strand (i.e., to slacken the floss strand) either manually or through a mechanical or electrical mechanism. This allows the floss strand to curve around the contour of the tooth and to clean multiple surfaces of the tooth, not only the interdental surface, but also the front surface and back surface of the tooth. After the user has cleaned the tooth, the user can again increase or maintain the tension of the floss strand and to pull the floss strand out from between the teeth. The user can repeat this process to adjust of the tension of the floss strand and to clean additional teeth in the user's mouth.

In some embodiments, the dental flosser comprises a longitudinal guide groove or channel in the handle portion. The groove or channel is dimensioned such that the slide member can fit into the groove or channel and can slide along the groove or channel. The user can fit the slide member into the groove or channel and then use his or her thumb or finger to slide the slide member along the groove or channel. When the slide member is moved in one direction, it increases the tension of the floss strand. When the slide member is moved in the other direction, it decreases the tension of the floss strand. Therefore, the user can adjust the tension of the floss strand at will by sliding the slide member along the guide groove.

It should be understood that the adjustment of the tension of the floss strand is accomplished through the floss strand attachment piece (e.g., the slide member) which is connected to only one end of the floss strand, whereas the other end of the floss strand is securely fastened to one of the arms of the U-shaped portion. Therefore, one end of the floss strand is fixed, and the other end of the floss strand is moveable when the user moves or manipulates the floss strand attachment piece. This makes it easier for the user to fine-tune the tension of the floss strand, since the position of one end of the floss strand is fixed.

It should be understood that the adjustment of the tension of the floss strand is not accomplished through the deformation of the U-shaped portion. The U-shaped portion is generally a rigid structure that does not deform easily. The dental flosser can be made of a thermoplastic material that has enough rigidity or toughness. The distance between the first and second arms of the U-shaped portion generally does not change.

Figure 2:
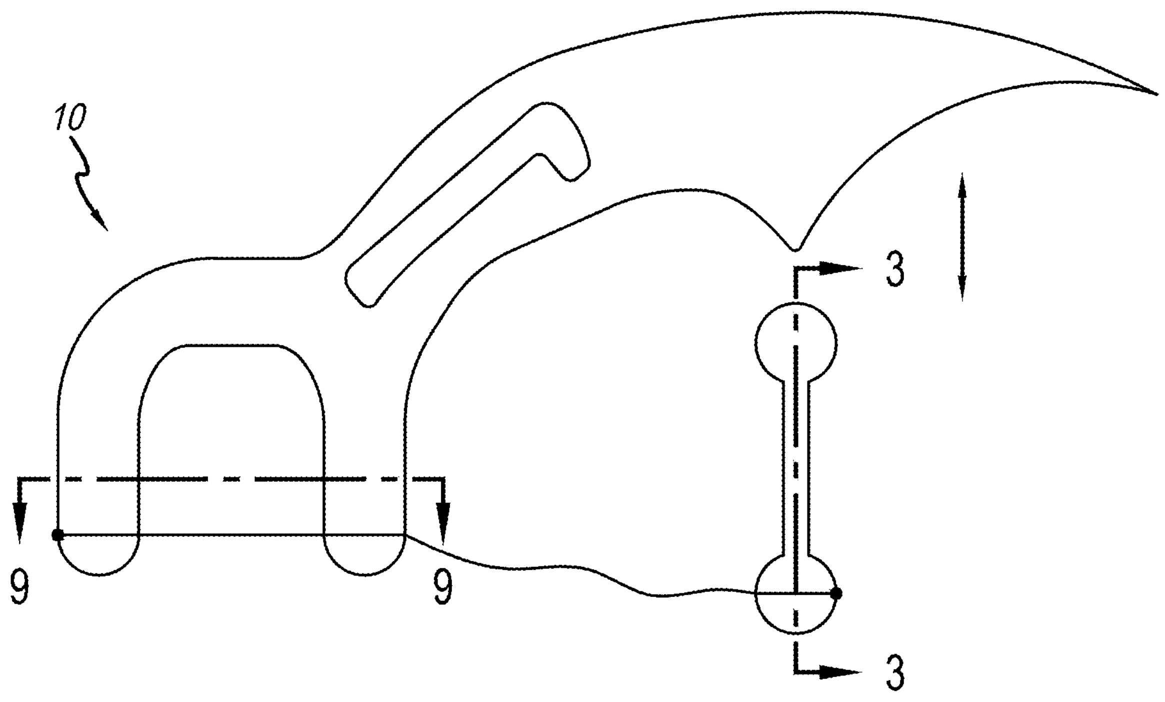
FIG. 2 shows the floss holder of FIG. 1, wherein the slide member portion is broken apart from the handle portion of the dental flosser.

FIGS. 1 and 2 show a dental flosser 10 according to an example embodiment of the present invention. Dental flosser 10 comprises a U-shaped portion 12, a handle portion 14 and a detachable slide member portion 16. In FIG. 1, slide member portion 16 is connected to handle portion 14 at a narrow connecting point 18. Dental flosser 10 is manufactured as a one-piece product through an injection molding process. The material for manufacturing dental flosser 10 can be a thermoplastic material.

In FIG. 2, slide member portion 16 is broken apart from handle portion to form a separate slide member component. This is usually done by a user, but may be done elsewhere. U-shaped portion 12 comprises a base 20 and a pair of spaced apart arms 22 and 24 extending from base 20. In FIG. 1, the arms 22 and 24 are shown oriented substantially parallel to one another, but it will be understood that they may be otherwise oriented to provide spaced apart ends.

A strand of dental floss 26 extends from arm 22 to arm 24 and further to slide member portion 16. A first end of floss strand 26 is securely fastened to arm 22. A second end of floss strand 26 is securely fastened to slide member portion 16. Portions of the ends of floss strand 26 are embedded in arm 22 and slide member 16. In the manufacturing process, dental flosser 10 is injection molded with floss strand 26 in situ, such that floss strand 26 passes through arm 22, arm 24, and slide member portion 16. Floss strand 26 can slide though a channel in arm 24. The ends of floss strand 26 are secured to arm 22 or slide member portion 16. One example method is to let the ends of floss strand 26 to extend out from the plastic during the injection molding process and to heat or burn the floss strand ends to coalesce into beads of diameter greater than the floss, which prevents the floss strand from being pulled out from arm 22 or slide member portion 16.

U-shaped portion 12 and handle portion 14 are generally flat members. The plane of U-shaped portion 12 may be substantially in the same plane as handle portion 14. Therefore, floss strand 26 when tensioned may be on the same plane as the plane of handle portion 14. This feature make it easier for the user to know the orientation of floss strand 26 when using dental flosser 10 by holding handle portion 14 to place floss strand 26 into interdental space between teeth. In another embodiment, the U-shaped portion 12 and handle portion 14 may not be in the same plane. The handle portion 14 may define the first plane at least at the portion of the handle portion where the slot or groove is located and the first plane bifurcates the handle portion 14 and the slot 28.

Dental flosser 10 also comprises a groove 28 in handle portion 14. Groove 28 is an elongated groove. The transverse dimension and the depth of groove 28 is such that slide member 16 can be received in groove 28 and move along groove 28 in a longitudinal direction thereof. The longitudinal length of groove 28 would control the maximum extent slide member 16 can move along groove 28.

Figure 3:
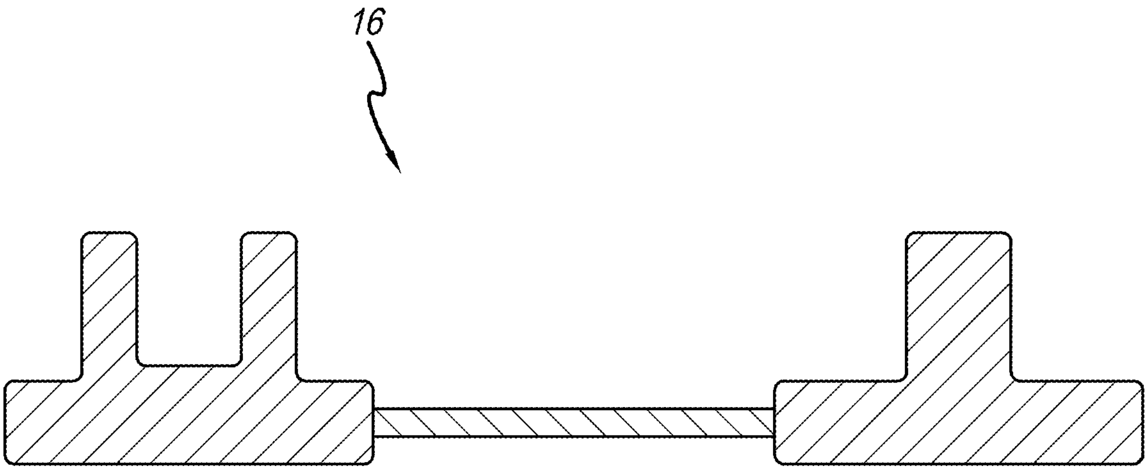
FIG. 3 shows a cross-sectional view of the slide member in isolation from the rest of the dental flosser. One end of the slide member comprises a female member, and the other end of the slide member comprises a corresponding male member of a dimension such that the slide member can be folded and the male member can fit into the female member.

FIG. 3 shows a cross-sectional view of slide member 16 in isolation from the rest of the dental flosser. For simplicity, the floss strand is not shown in FIG. 3. One end of slide member 16 comprises a female member, and the other end of the slide member comprises a corresponding male member of a dimension such that the male member can fit into the female member when slide member 16 is folded by the user.

Figure 4:
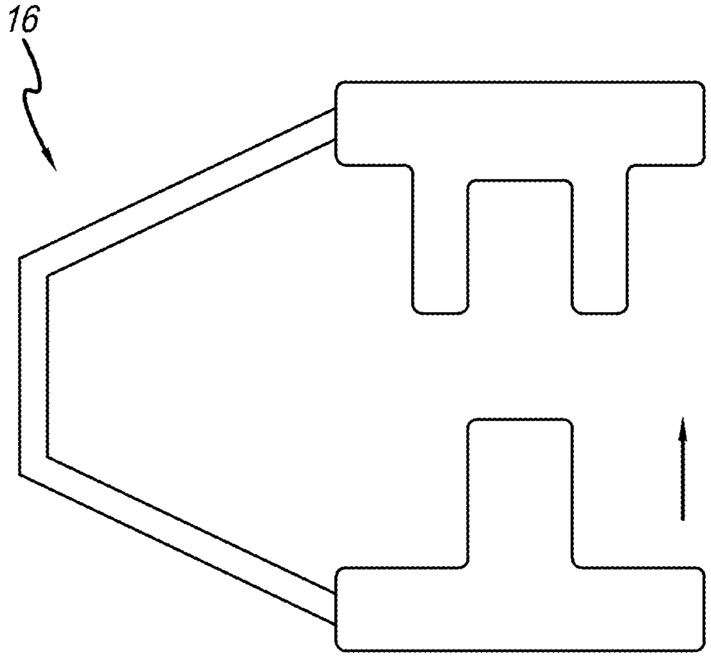
FIG. 4 shows a cross-sectional view of the slide member of FIG. 3, wherein the slide member is being folded to allow the male member to be connected to the female member.

FIG. 4 shows a cross-sectional view of slide member 16 of FIG. 3, wherein the slide member is being folded to allow the male member to be connected to the female member. The folded slide member 16 is easier for the user's thumb or finger to hold and maneuver.

Figure 5:
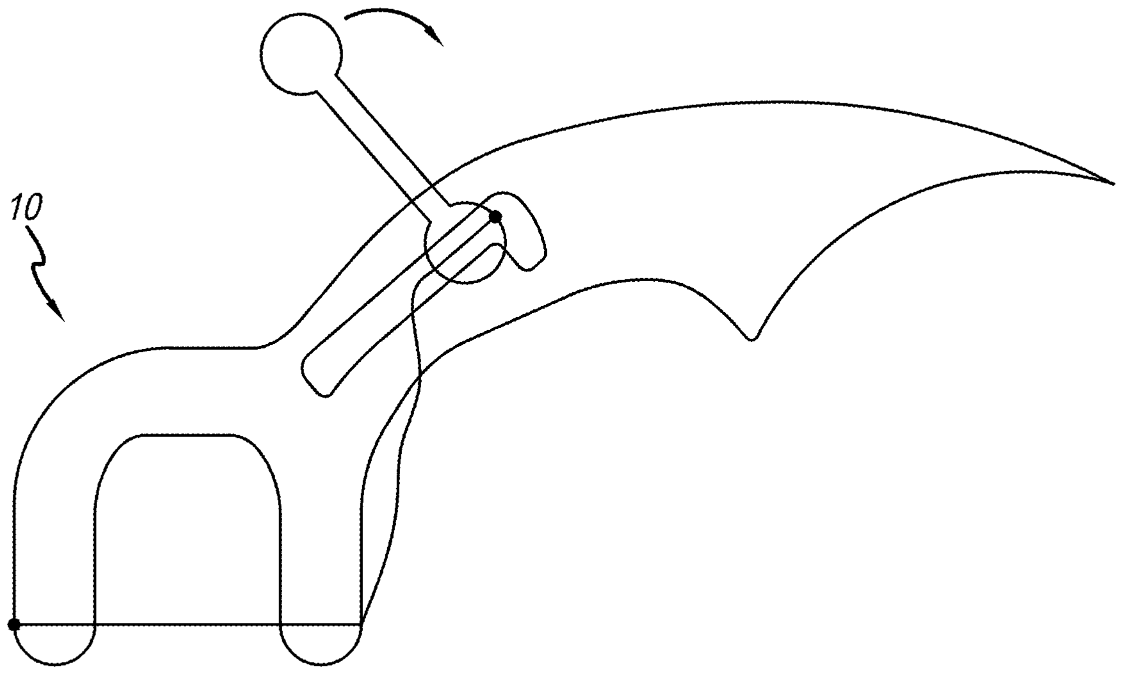
FIG. 5 shows the dental flosser of FIG. 2, wherein the unfolded slide member is fit into a guide groove or channel in the handle portion of the dental flosser.
Figure 6:
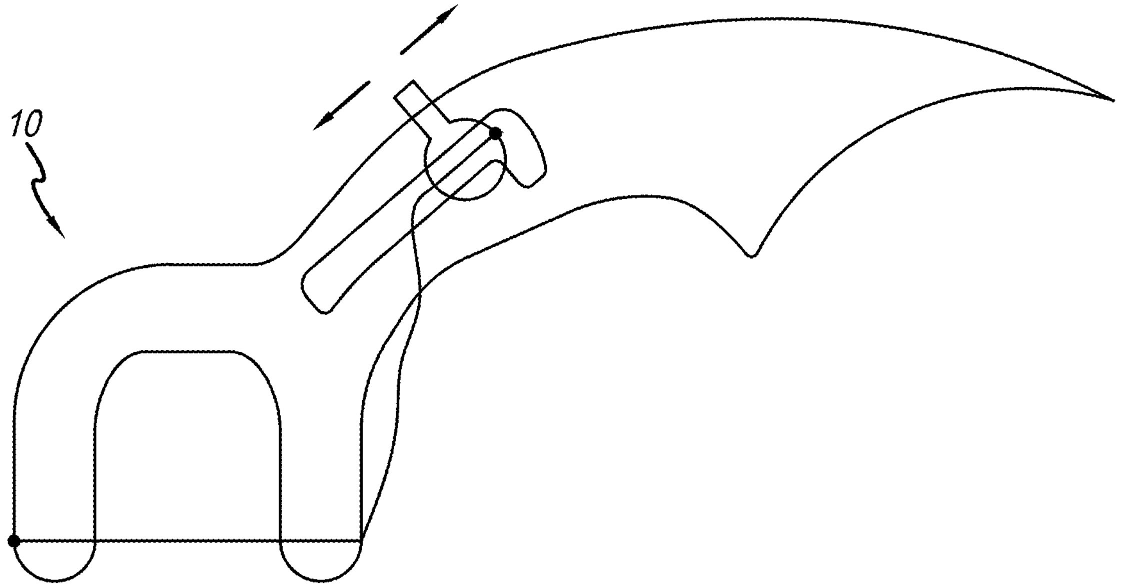
FIG. 6 shows the dental flosser of FIG. 5, wherein the slide member is folded in a way as illustrated in FIGS. 3 and 4.

FIG. 5 shows dental flosser 10, wherein unfolded slide member 16 is fit into groove 28 of dental flosser 10. FIG. 6 shows slide member 16 is now folded so that it is easier for the user to hold and maneuver slide member 16.

Figure 7:
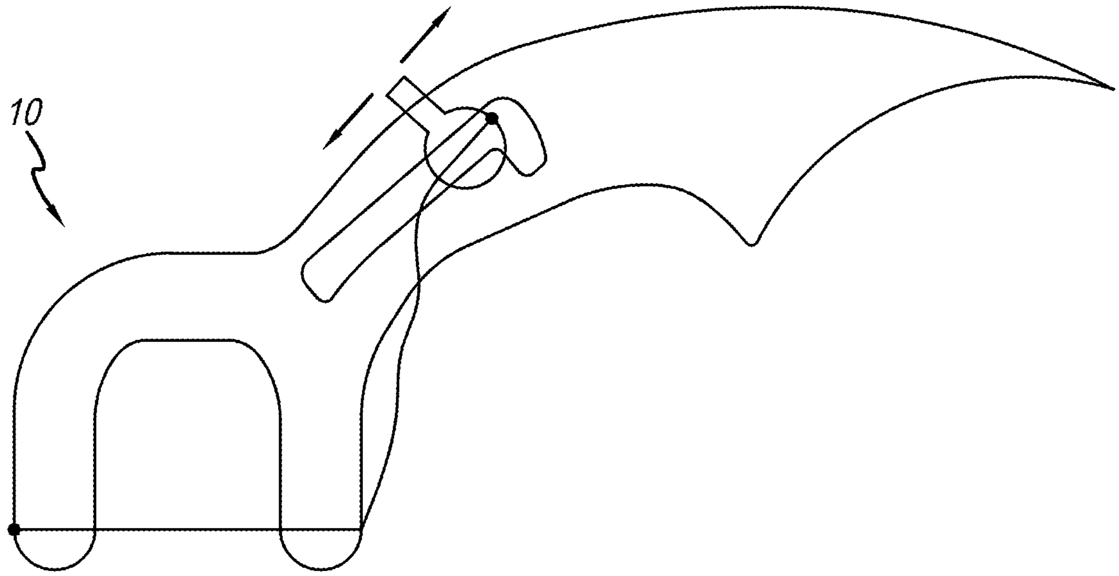
FIG. 7 shows the dental flosser of FIG. 6, wherein the slide member moves in a first direction along the guide groove or channel to increase the tension of the floss strand.

FIG. 7 shows slide member 16 moves in a first direction along groove 28 to increase the tension of floss strand 26. In FIG. 7, the tensioned floss strand 26 between arms 22 and 24 is straight. When floss strand 26 is tensioned, the user can press dental flosser 10 downward to insert floss strand 26 into an interdental space between two adjacent teeth.

Figure 8:
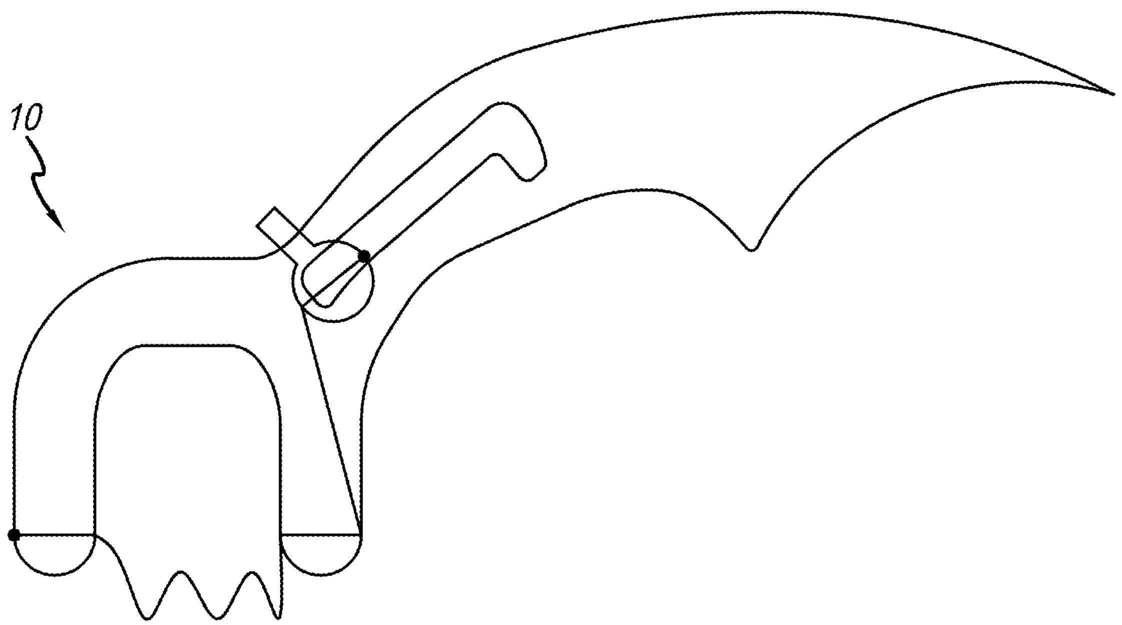
FIG. 8 shows the dental flosser of FIG. 6, wherein the slide member moves in a second direction along the guide groove or channel to decrease the tension of the floss strand.

FIG. 8 shows slide member 16 moves in a second direction along groove 28 to decrease the tension of floss strand 26. In FIG. 8, floss strand 26 between arms 22 and 24 is slack and has an increased length. The user can maneuver dental flosser 10 sideways to let floss strand 26 to curve around the contour of a tooth.

It should be understood that the total length of floss strand 26 provided with dental flosser 10 is fixed. Floss strand 26 is already fastened to dental flosser 10 during the manufacturing process. The user does not need to mount or string floss strand 26 to dental flosser 10. However, the user can maneuver slide member 16 to adjust the length (and the tension) of the portion of floss strand 26 between arms 22 and 24.

Figure 9:
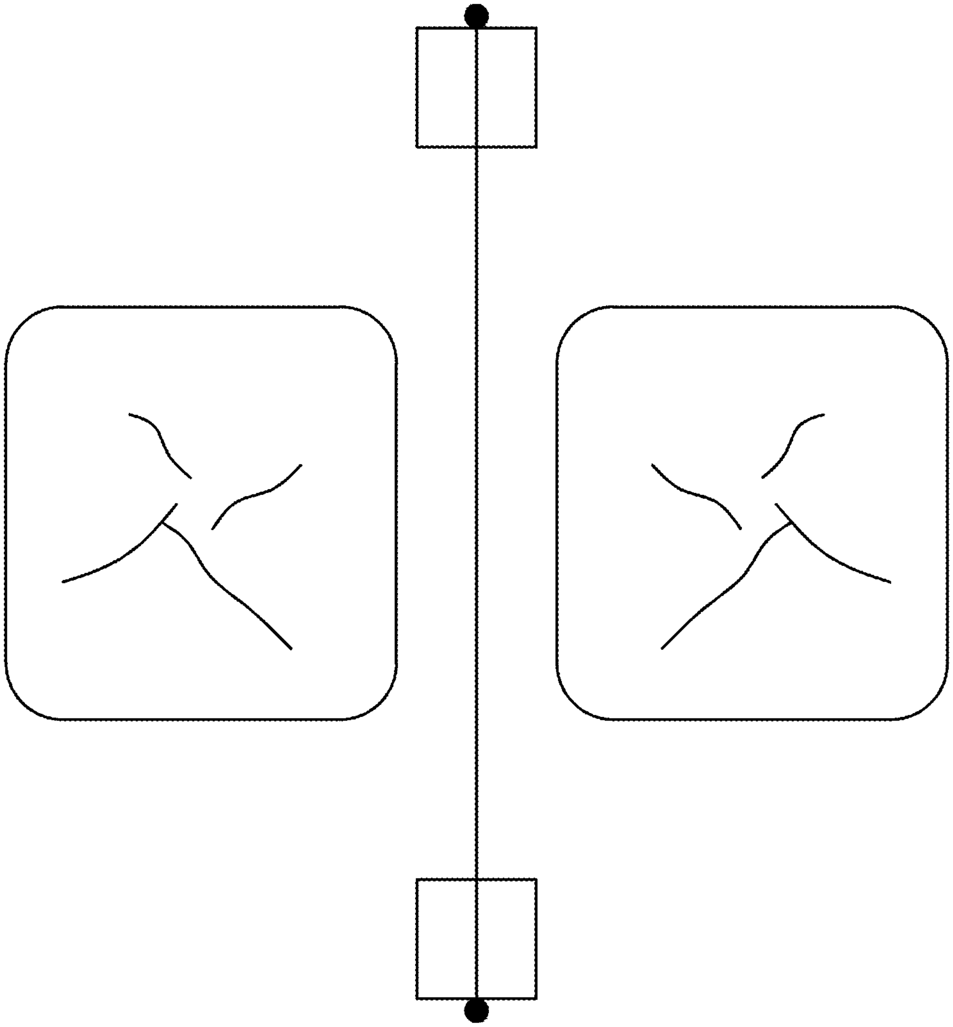
FIG. 9 shows a schematic top view of two adjacent teeth and the cleaning portion of a floss strand inserted in an interdental space between the teeth.
Figure 10:
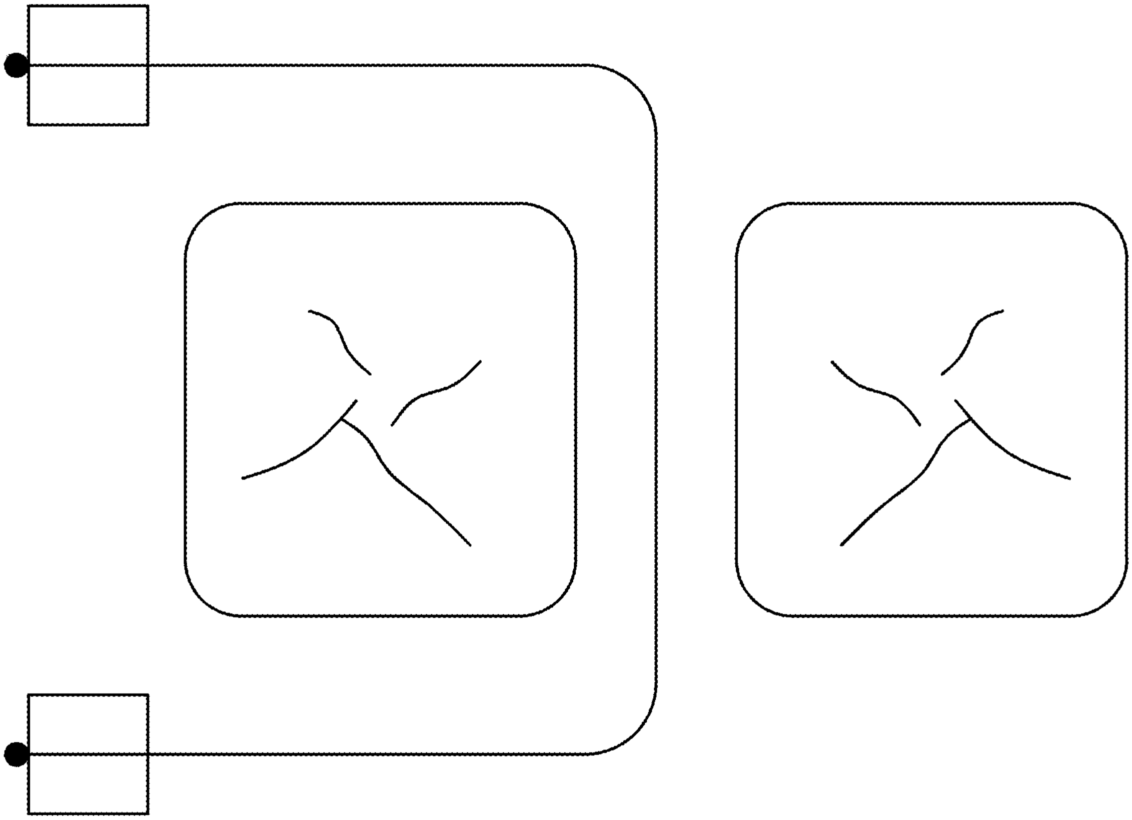
FIG. 10 shows a schematic top view of two adjacent teeth and the cleaning portion of a floss strand surrounding the interdental surface as well as the front surface and the back surface of one of the teeth.

FIG. 9 shows a schematic top view of two adjacent teeth and the position of a tensioned dental strand in an interdental space between the teeth. FIG. 10 shows a schematic top view of two adjacent teeth and the position of a relaxed dental strand surrounding the interdental space as well as the front surface and the back surface of a tooth.

Compared to conventional dental flossers, dental flosser 10 is advantageous in a number of ways. First, dental flosser 10 can be used to simultaneously clean three surfaces of a tooth (the interdental surface, the front surface and the back surface). Second, the user can adjust the tension of the floss strand at will. Since one end of floss strand is fixed to arm 22 and does not move, the user only needs to move the other end of floss strand which is attached to slide member 16. Third, the user can adjust the length of the floss strand between arms 22 and 24 to fit teeth of different sizes and dimensions. Fourth, dental flosser 10 can be conveniently manufactured as a one-piece product including floss strand and the detached or detachable slide member portion in an injection molding process. Fifth, the volume of material for manufacturing dental flosser 10 is not much greater than manufacturing a conventional dental flosser. The slide member portion is a small component, and does not add much volume of material for manufacturing dental flosser 10. Injection molding equipment can be used or adapted to manufacture dental flosser 10. No specialized equipment or machinery or assembly is required to manufacture dental flosser 10. Sixth, dental flosser 10 can be sold as a disposable product, which provides more convenience for some consumers.

Seventh, the user does not have to worry about floss strand 26 accidentally getting detached from dental flosser 10, because floss strand 26 is securely and permanently fastened to dental flosser 10.

Figure 11:
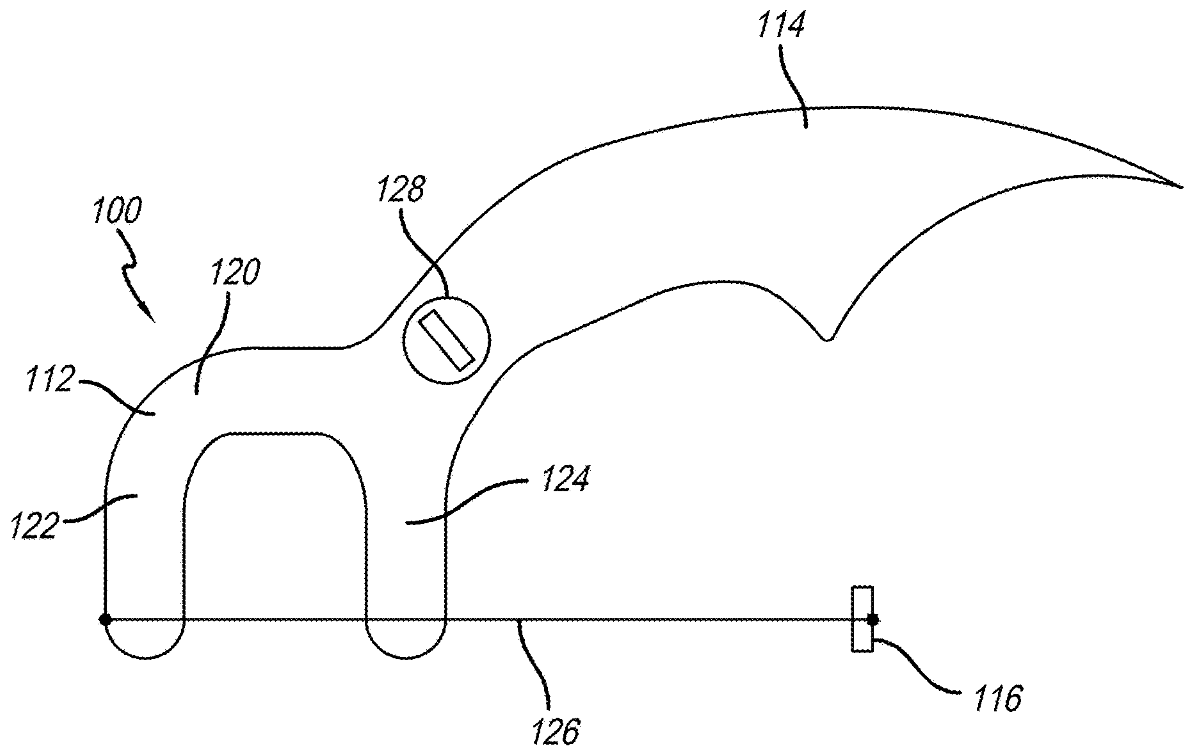
FIG. 11 shows a side view of a dental flosser according to another example embodiment of the invention, wherein one of the terminal ends of the floss strand is connected to a floss strand attachment piece, and the dental flosser comprises a rotation mechanism.
Figure 12:
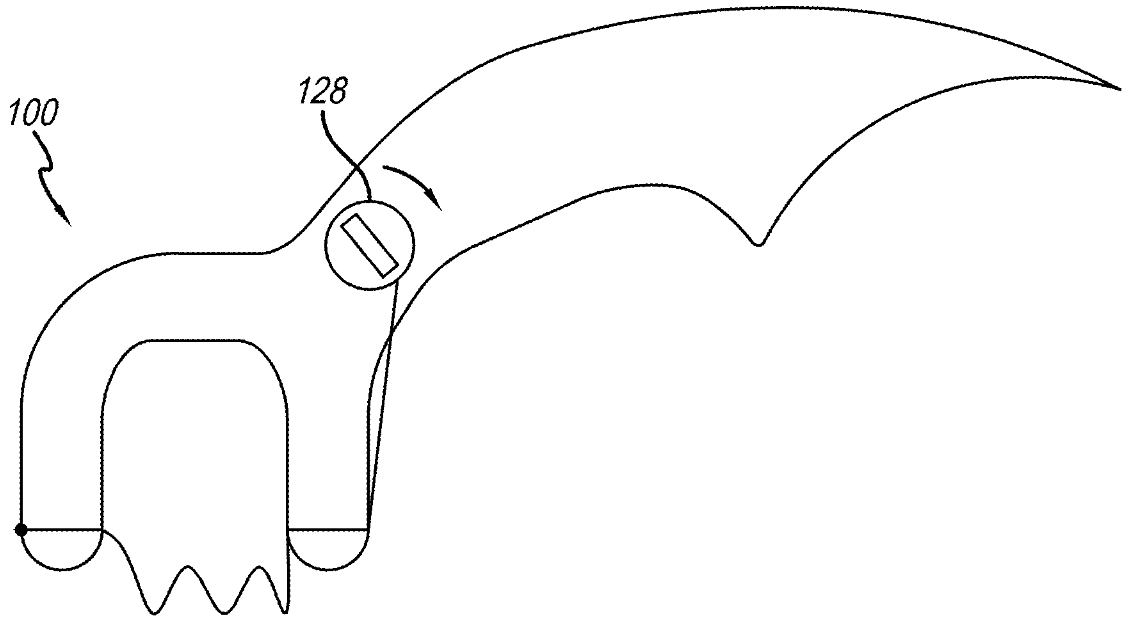
FIG. 12 shows the dental flosser of FIG. 11, wherein the floss strand attachment piece is attached to the rotation mechanism, and wherein the floss strand is slack.
Figure 13:
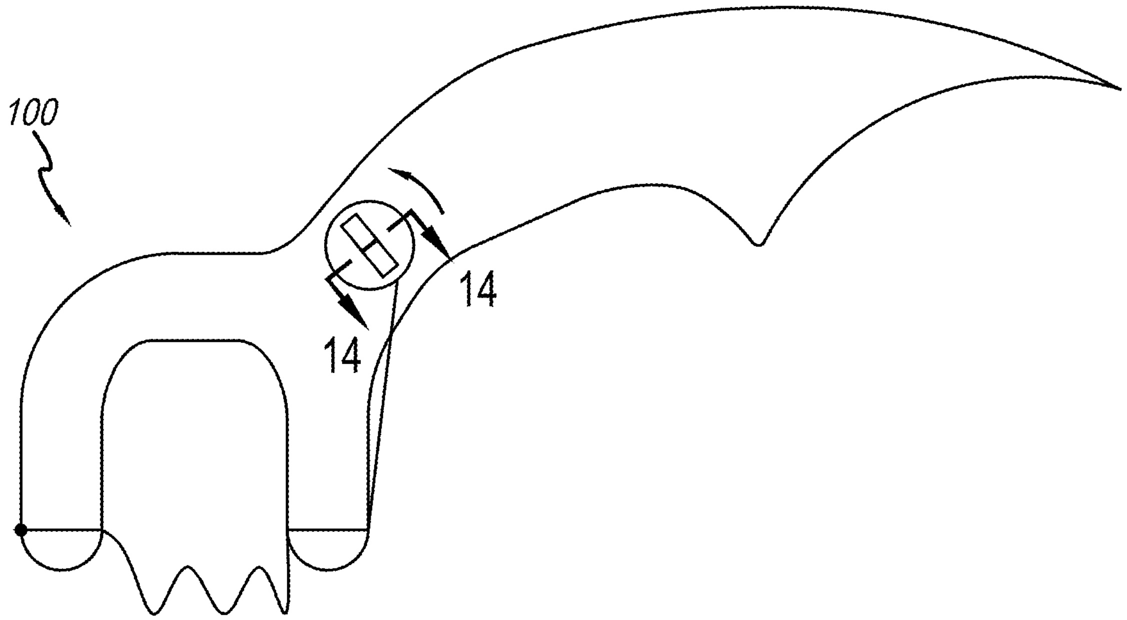
FIG. 13 shows the dental flosser of FIG. 11, wherein the floss strand attachment piece is attached to the rotation mechanism and the rotation mechanism is rotated in a counterclockwise direction to increase the tension of the floss strand.

FIGS. 11 through 13 show a dental flosser 100 according to another example embodiment of the present invention. Dental flosser 100 comprises a U-shaped portion 112, a handle portion 114, and a floss strand attachment member 116. U-shaped portion 112 comprises a base 120 and a pair of spaced apart arms (first arm 122 and second arm 124) extending from base 120. Dental flosser 100 comprises a floss strand 126. Floss strand 126 has a first terminal end which is fixedly attached to first arm 122 of U-shaped portion 112. The position of the first terminal end of floss strand 126 does not move relative to first arm 122 of U-shaped portion 112. As shown in FIGS. 11 through 13, the first terminal end of floss strand 126 is fixedly attached to an end of first arm 122. Floss strand 126 has a second terminal end which is attached to floss strand attachment member 116. As shown in FIGS. 11 through 13, floss strand attachment member 116 can be separate from handle portion 114, but can also be connectable to a rotation mechanism 128 on handle portion 114. A user can manipulate floss strand attachment member 116 either manually (or mechanically or electronically) to move the second terminal end of floss strand 126 to increase or decrease or maintain tension of the floss strand.

A middle portion of floss strand 126 is slideably mounted on second arm 124 of U-shaped portion 112 such that a middle portion of the floss strand can slide relative to second arm 124 of U-shaped portion 112. A number of possible mounting mechanisms may be employed to enable a middle portion of the floss strand to be slideably mounted on the second arm of the U-shaped portion, such as a fixed pulley, a pivot, a wheel, a rotor, a channel, a passageway, a hole, or some other suitable means.

In the example shown in FIG. 11, the mounting mechanism is a channel at or near the end of second arm 124 of U-shaped portion 112. A middle portion of floss strand 126 can slide through the channel in second arm 124.

Figure 14:
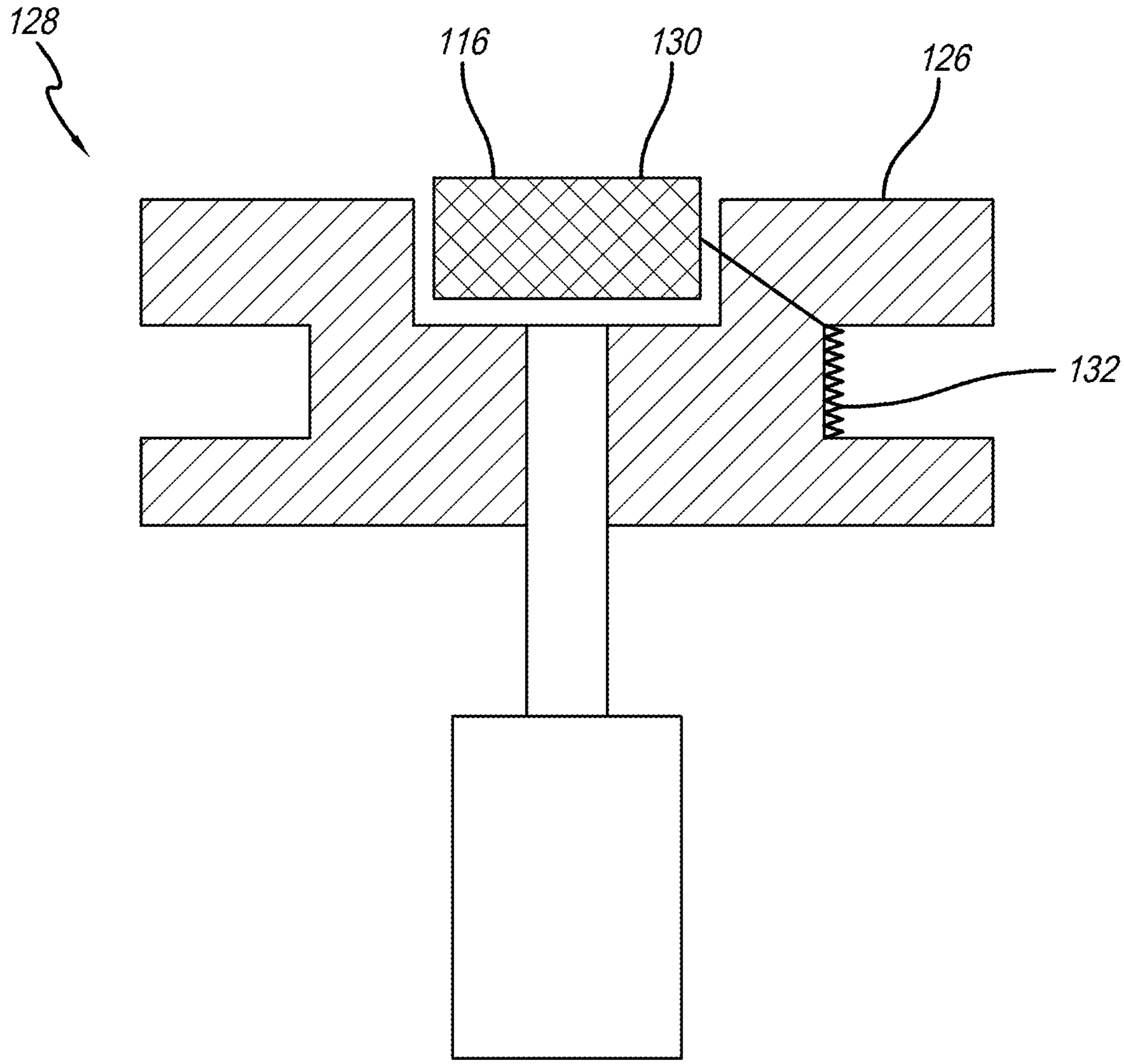
FIG. 14 is an enlarged cross-sectional view of an example rotation mechanism which can be used in the dental flosser of FIG. 11.

Dental flosser 100 comprises a rotation mechanism 128. Rotation mechanism can be a manual, mechanical or electrical rotation mechanism. As shown in FIGS. 12 and 13, a user can attach floss strand attachment member 116 to rotation mechanism 128. Once attached, the user can rotate rotation mechanism 128 in one direction (e.g., counterclockwise) to increase the tension of floss strand 126. The user can also rotate rotation mechanism 128 in another direction (e.g, clockwise) to decrease the tension of floss strand 126. If needed, the user can also disconnect floss strand attachment member 116 from rotation mechanism 128. FIG. 14 shows an enlarged cross-sectional view of an example rotation mechanism 128 which can be used. Rotation mechanism 128 comprises a recess 130 for receiving floss strand attachment member 116 and a circular groove 132 for winding floss strand 126.

Figure 15:
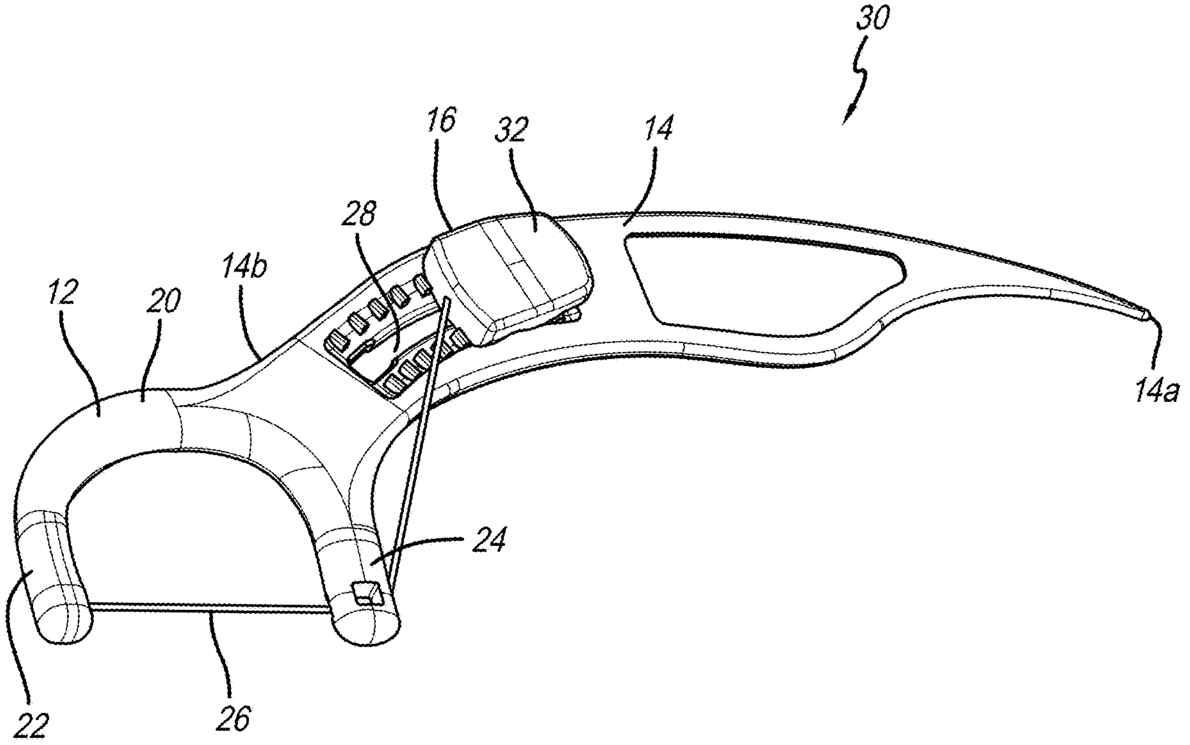
FIG. 15 is a perspective view of a dental flosser in accordance with a preferred embodiment of the present invention.

FIGS. 15-25 show another preferred embodiment of a dental flosser 30 that includes a U-shaped portion 12 having a first arm 22 and a second arm 24 spaced apart from each other. The second arm includes a channel 29 defined therethrough through which the dental floss strand 26 extends. The dental flosser 30 includes a handle portion 14 that extends from the U-shaped portion 12. The handle portion 14 includes a proximal end 14*a* and a distal end 14*b* and the proximal end is distant from the U-shaped portion 12, as shown in FIG. 15. The dental flosser 30 preferably includes a floss strand attachment member 16 associated with and movable with respect to the handle portion 14. The dental floss strand 26 is attached, secured or otherwise connected to the floss strand attachment member 16. The floss strand attachment member 16 is movable between a plurality of positions to increase or decrease the tension of the floss strand. Preferably, the floss strand attachment member 16 is movable between at least a first position and a second position. When the floss strand attachment member 16 is moved toward the proximal end 14*a* of the handle portion 14 the tension of the floss strand is increased. FIG. 17A shows the floss strand attachment member 16 in the rear most proximal most position and FIG. 17B shows the floss strand attachment member 16 in the forwardmost or distal most position.

Figure 21:
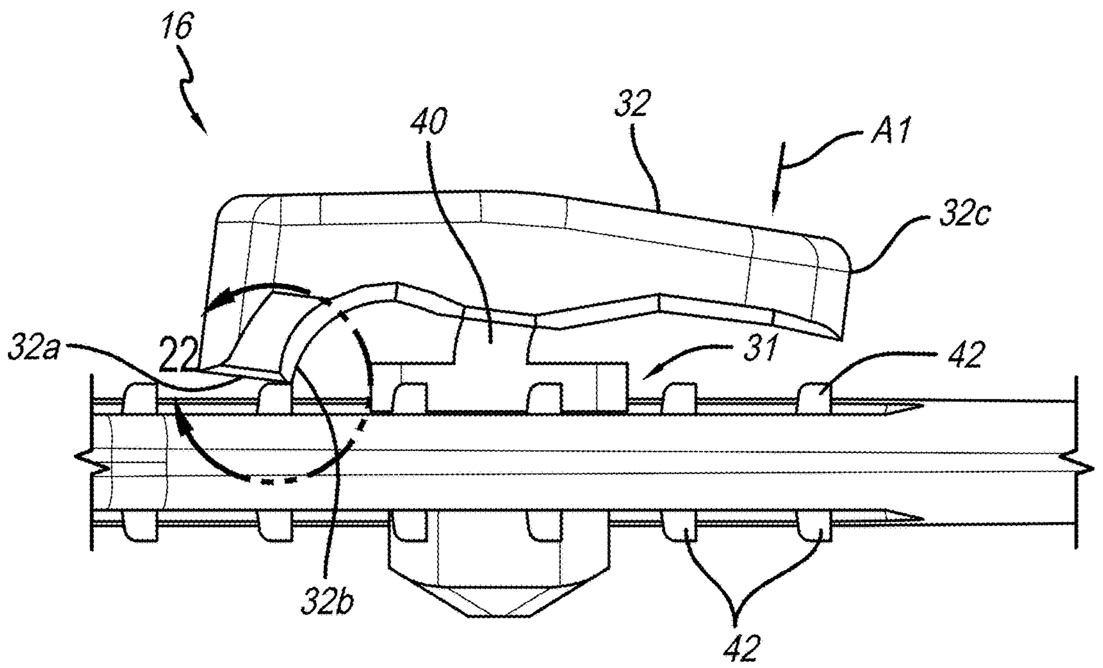
FIG. 21 is a bottom plan view of the slider or floss strand attachment member with the contact member pivoted to the disengaged position.
Figure 22:
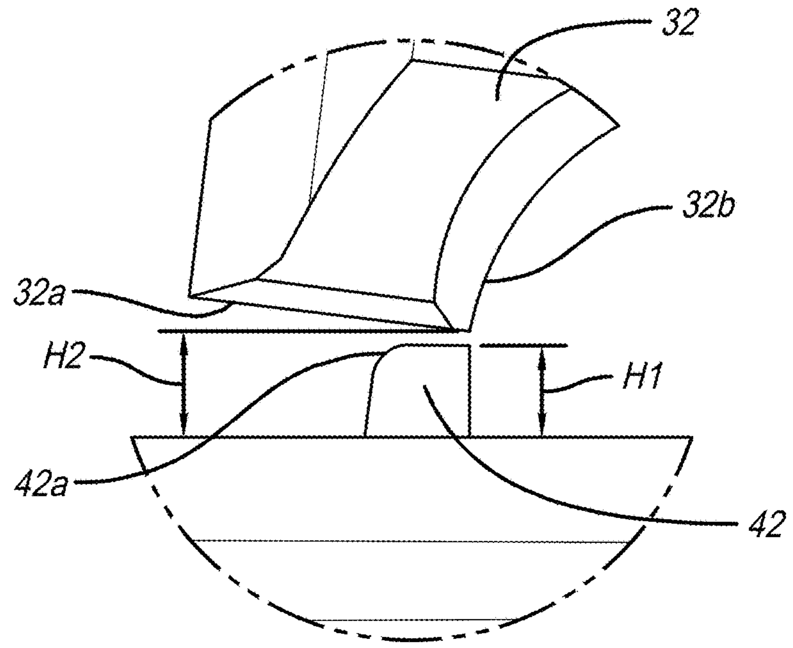
FIG. 22 is a detail taken from 21-21 of FIG. 21.

In a preferred embodiment, the floss strand attachment member 16 includes a contact member 32 that is pivotable between an engaged position (see FIG. 20) and a disengaged position (see FIGS. 21 and 22). The handle portion 14 includes a groove or slot 28 defined therethrough. The dental flosser includes a top surface 30*a*, a bottom surface 30*b* and opposing first and second side surfaces 30*c* and 30*d*. The slot 28 is defined through the handle portion from the first side surface 30*c* to the second side surface 30*d*.

Figure 24:
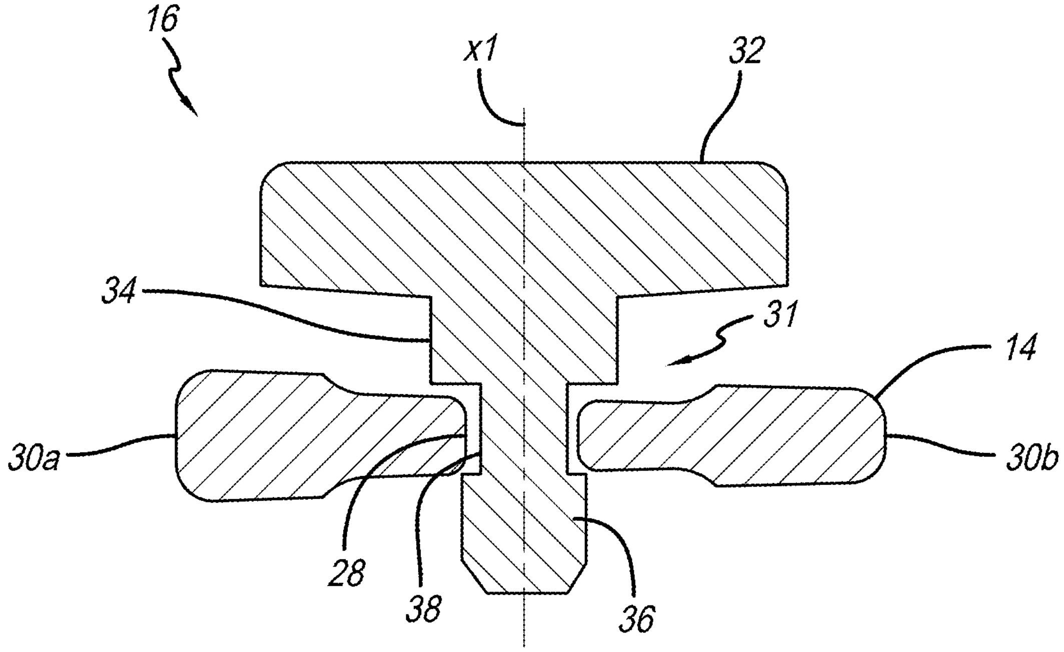
FIG. 24 is a cross-sectional view taken from line 24-24 in FIG. 20.

The floss strand attachment member 16 preferably includes the contact member 32 and a male member 31 extending from the contact member 32. Preferably, at least a portion of the male member 31 extends into the slot 28. As shown in FIG. 24, the male member 31 may include a first flange 34 and a second flange 36 with a groove 38 defined between the first and second flanges 34 and 36. The male member 31 preferably also includes a living hinge portion 40 connecting the contact member 32 to the male member 31. The contact member 32 is pivotable about the living hinge between the engaged position and the disengaged position.

In a preferred embodiment, the handle portion 14 and the U-shaped portion 12 are co-planar and define a first plane that bifurcates the handle portion 14 and the U-shaped portion 12. The male member 31 defines a first axis X1 and a first end that is attached to the contact member 32 and a second end opposite the contact member 32. The second end of the male member 31 can extend into the slot and through the first plane such that the first axis is perpendicular to the first plane while the contact member 32 is located outside the slot 28.

Figure 18:
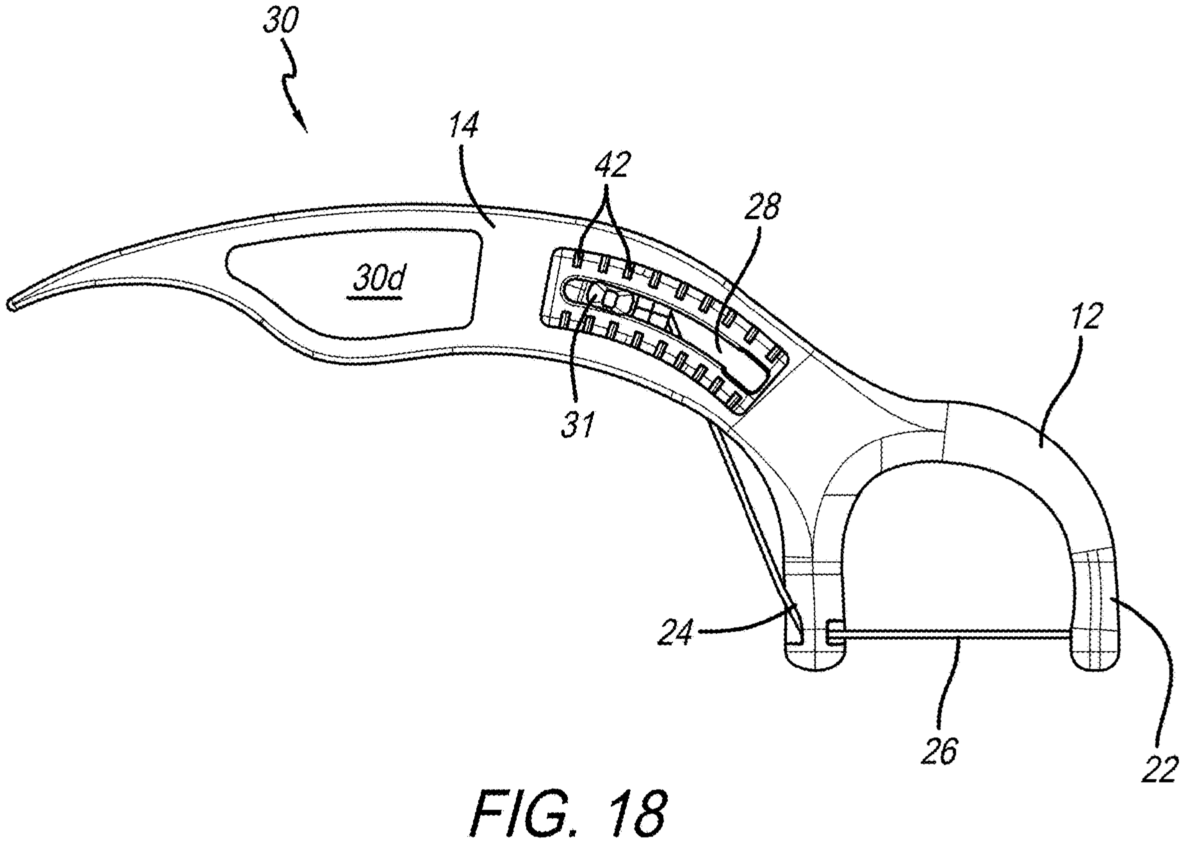
FIG. 18 is a left side elevational view of the dental flosser of FIG. 15.
Figure 19:
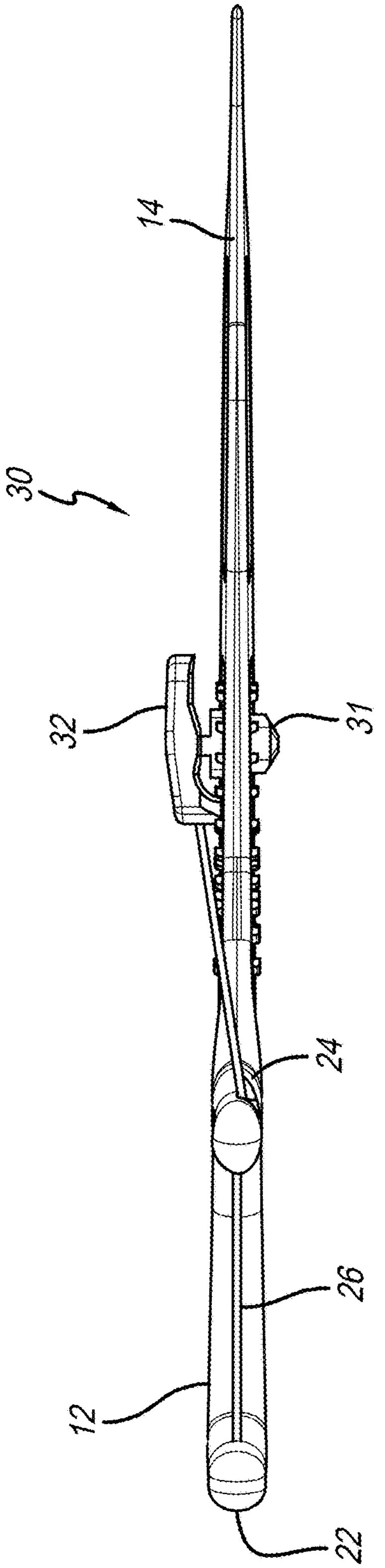
FIG. 19 is a bottom plan view of the dental flosser of FIG. 15.
Figure 20:
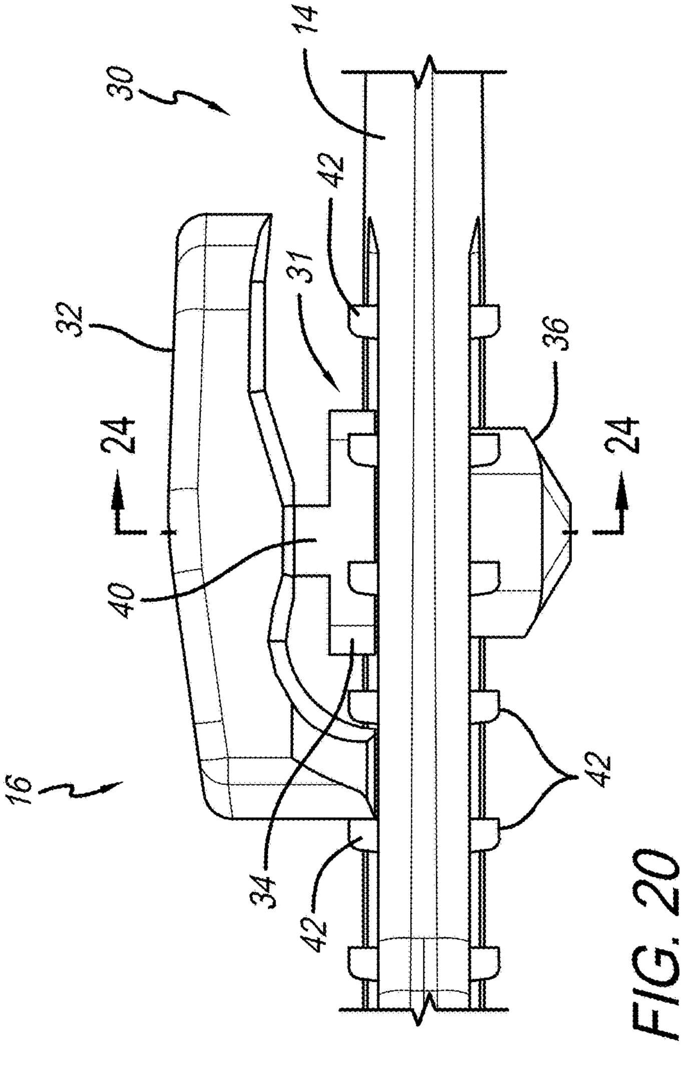
FIG. 20 is a bottom plan view of the slider or floss strand attachment member with the contact member in the engaged position.

In a preferred embodiment, the handle portion includes a plurality of teeth 42 or a plurality of sets of teeth 42 extending outwardly therefrom. Any number of teeth or sets of teeth is within the scope of the present invention. FIG. 18 shows nine sets of teeth. However, there can be anywhere between one and fifty sets of teeth. The teeth 42 help maintain the floss strand attachment member 16 or contact member 32 in position, thereby preventing it from moving forwardly or rearwardly or proximally or distally. FIGS. 20-23 show some of the different positions and movement of the contact member 32. As shown in FIG. 22, the teeth 42 define a first height H1. The contact member 32 defines a contact surface 32*a*. The contact member is movable to a second height H2 between the engaged position and the disengaged position. The second height H2 is greater than the first height H1. This allows the contact member 32 to clear the tooth 42 when moved forwardly or distally, as shown in FIG. 21. FIG. 21 includes arrow A1 to show how a user pushes inwardly (toward the handle) on the proximal end 32*c* of the contact member (to pivot the contact surface 32*a* and forward portion of the contact member 32 upwardly) and at least slightly forwardly to move the contact member 32 and entire floss strand attachment member 16 toward the U-shaped portion 12, which reduces the tension on the floss strand 26.

Figure 23:
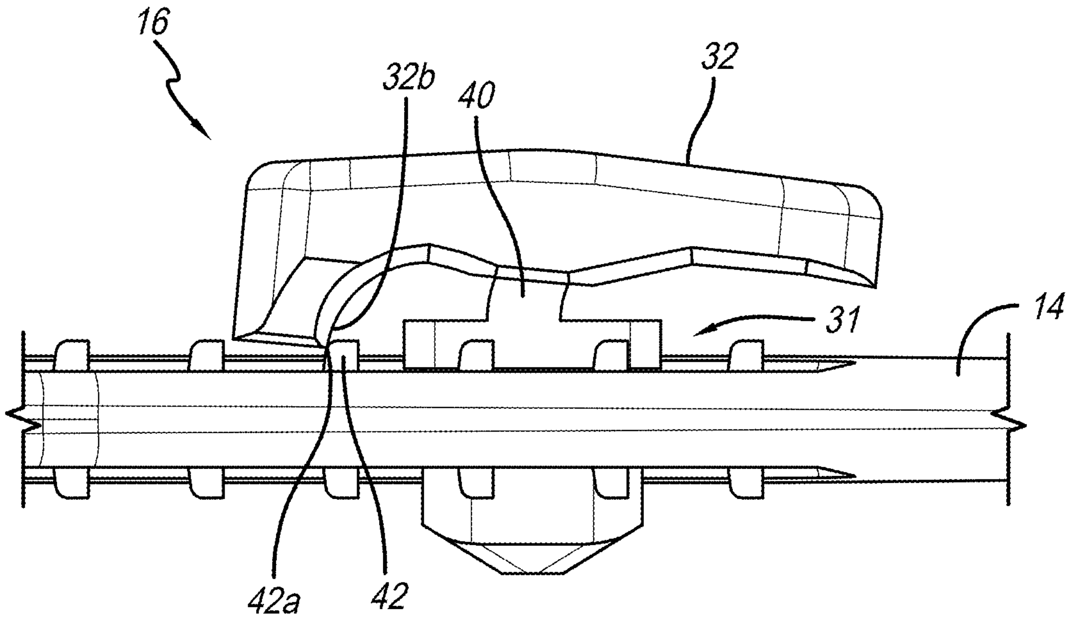
FIG. 23 is a detail bottom plan view of the slider showing the contact member being pushed rearwardly such that the contact member moves up and over the tooth.

FIG. 23 demonstrates how the floss strand attachment member 16 is moved rearwardly or proximally to increase the tension on the floss strand 26. In use, the user pushes rearwardly or proximally generally in the direction of arrow A2. Preferably, the contact member 32 includes a curved or inclined surface 32*b* that contacts a complementary curved or inclined surface 42*a* on the first tooth. As a result of the angle or curve of the surfaces, the contact member 32 moves up and over the complementary curved or inclined surface 42*a* on the tooth.

Figure 16:
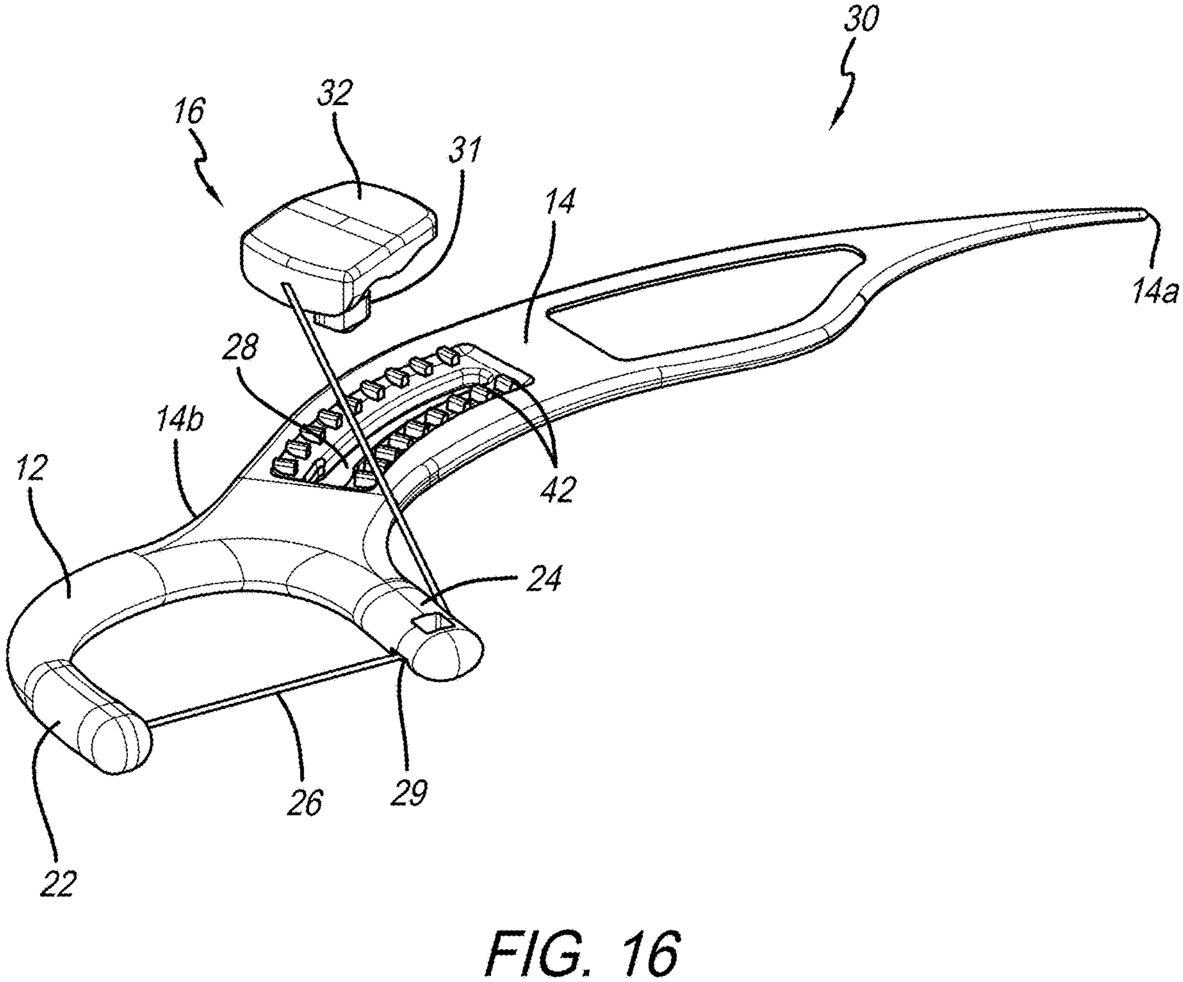
FIG. 16 is an exploded perspective view of the dental flosser of FIG. 15.
Figure 17A:
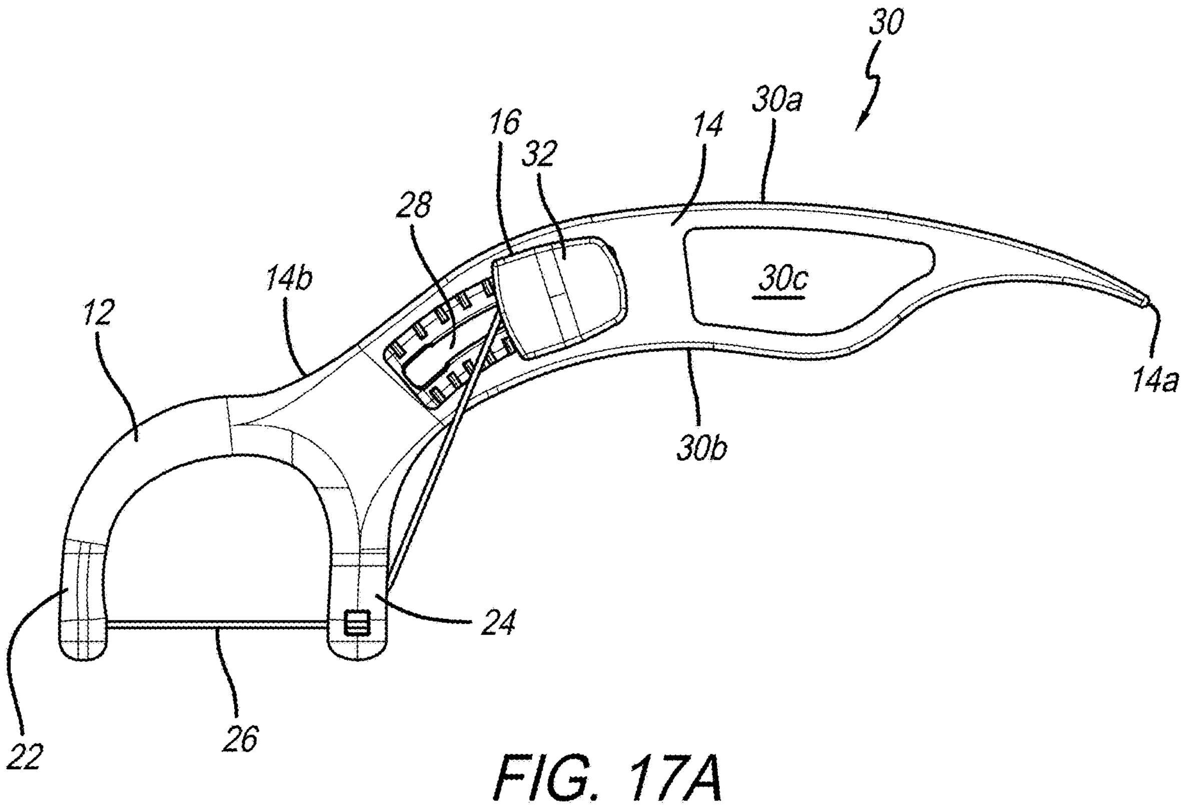
FIG. 17A is a right side elevational view of the dental flosser of FIG. 15 with the slider in a first position.
Figure 17B:
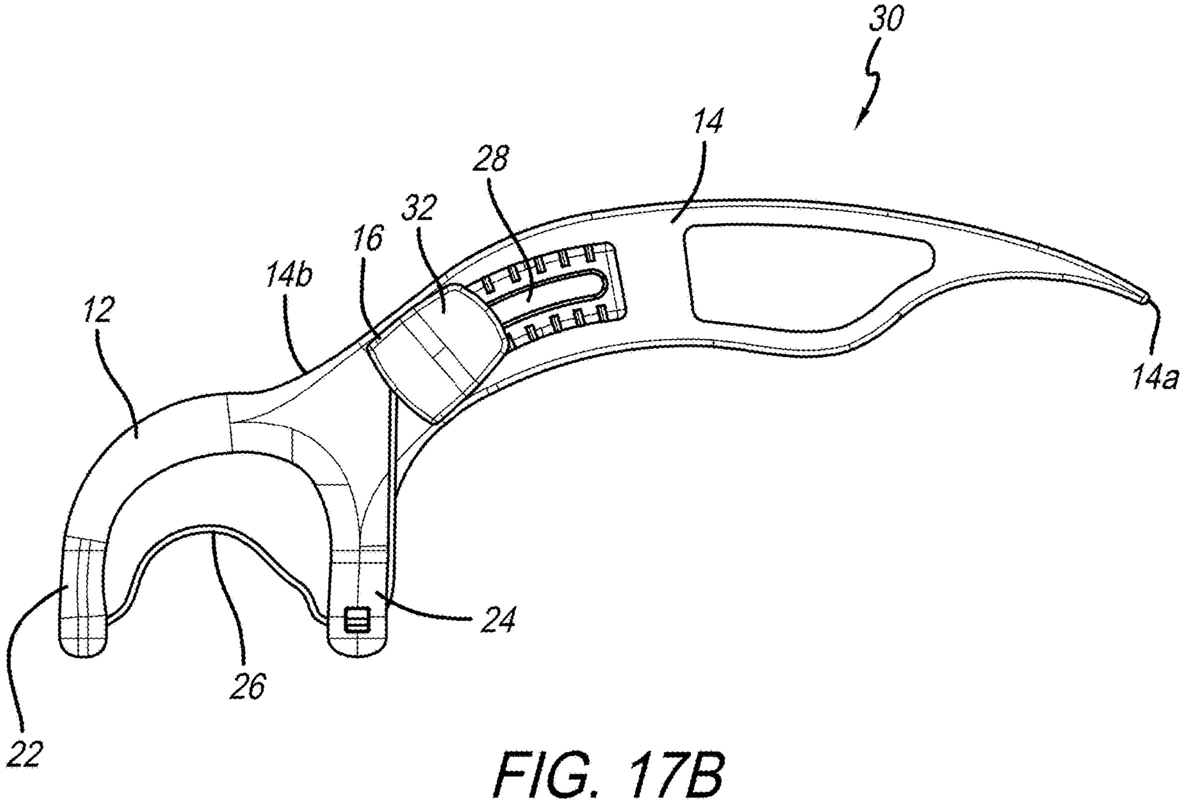
FIG. 17B is a right side elevational view of the dental flosser of FIG. 15 with the slider in a second position.

As shown in FIG. 16, each of the teeth 42 may be part of a set of two teeth with one or a first tooth positioned on a first side of the slot 28 and the other or a second tooth is positioned on a second side of the slot. As shown in FIG. 15, the front surface of the contact member 32 rests against both teeth in the set when in the engaged position. A single tooth in a set is also within the scope of the invention.

The second end of the male member 31 (e.g., the second flange 36) may include a generally pointed end with inclined or curved surfaces thereon to allow the male member 31 to be pushed through the slot 28 due to the malleability of the material of the handle. FIG. 16 shows the floss strand attachment member 16 exploded or removed from the slot. As shown in FIG. 18, sets of teeth may be included on the opposite side of the handle portion 14 than is shown in FIG. 16. This allows the floss strand attachment member 16 to be inserted through either side of the slot. In other words, the floss strand attachment member 16 is reversible with respect to the handle portion 14.

Figure 25:
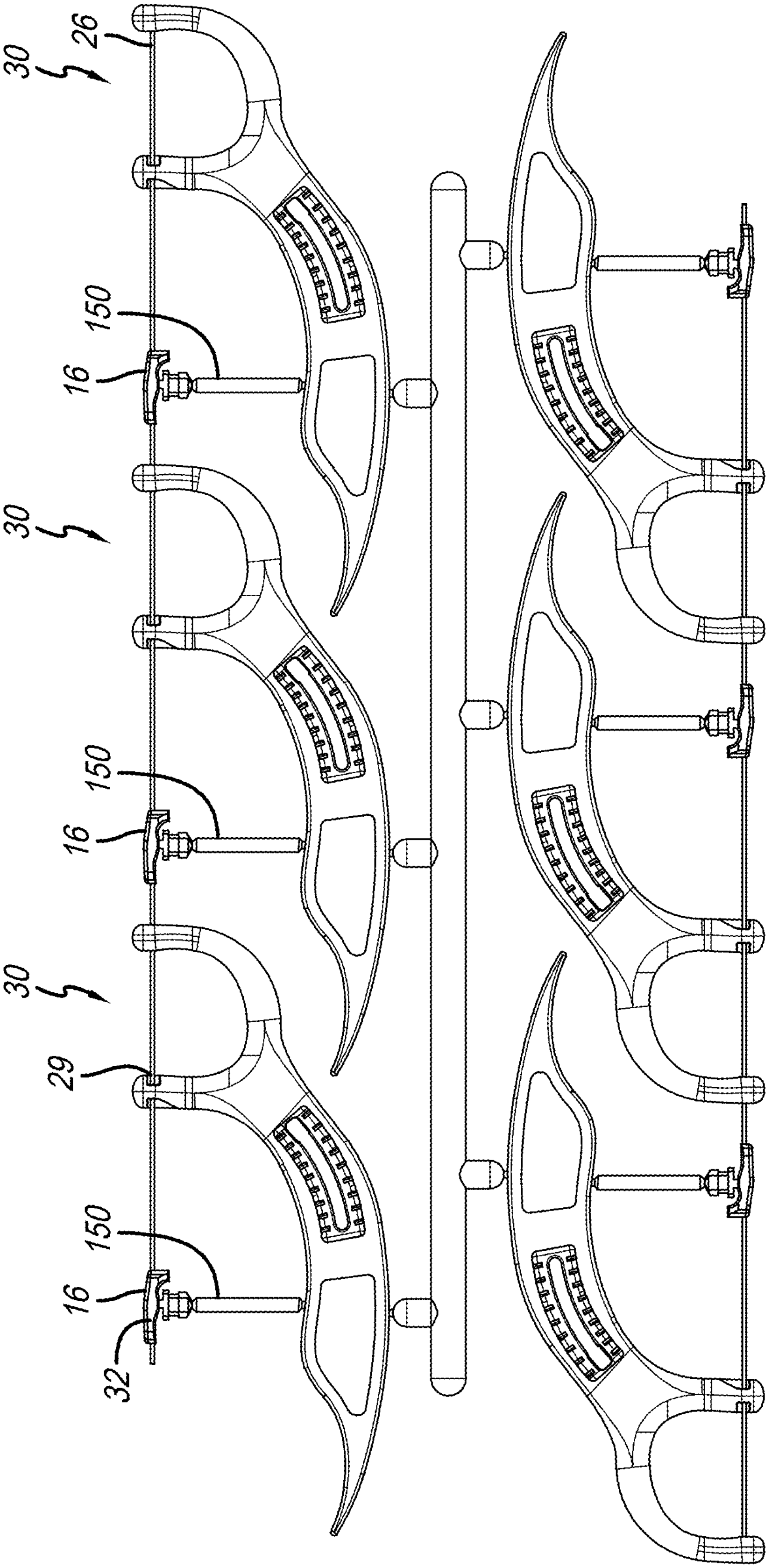
FIG. 25 is a side elevational view of a plurality of dental flossers during the manufacturing process.

FIG. 25 shows a series of dental flossers 30 after being manufactured via the injection molding process (still on the sprue), but before the floss strand attachment members 16 have been separated from the runners 150. As shown, the floss strand attachment members 16 and the contact members 32 thereof are aligned with the channels 29 so that the floss strand 26 is straight during the injection molding process. This may be advantageous in manufacturing.

FIGS. 26-33 show further detail regarding an embodiment of the channel 29 extending through the second arm 24 and that allows the floss strand 26 to move therethrough and the connection of the floss on the first arm 22. As discussed above a middle portion of the floss strand 26 extends through the channel 29. The channel 29 extends through the second arm 24 in a longitudinal direction (with respect to the dental flosser) and in a direction generally parallel to a plane bifurcating the U-shaped portion 12 (and handle portion 14, in the embodiment shown in the figures). In other words, the channel extends proximally and distally as these terms are defined herein.

In a preferred embodiment, at least a portion of the floss strand 26 is exposed to one or more of the first and second sides of the second arm 24 as the floss strand 26 passes through the channel 29. As a result, it will be appreciated that because the floss strand 26 has less contact area with the plastic of the second arm when extending through the channel (that may include prongs, windows and/or notches, as described herein), the floss strand may slide easier due to the reduced surface area that the floss strand is contacting. One of the key enabling features of this embodiment that allows smooth sliding of the floss strand 26 within the channel 29 is that most (if not all) of the floss strand 26 is in contact with the material (e.g., thermoplastic) of the second arm 24 (and the inner surface of the channel or the prongs) on at most one side.

Figure 31:
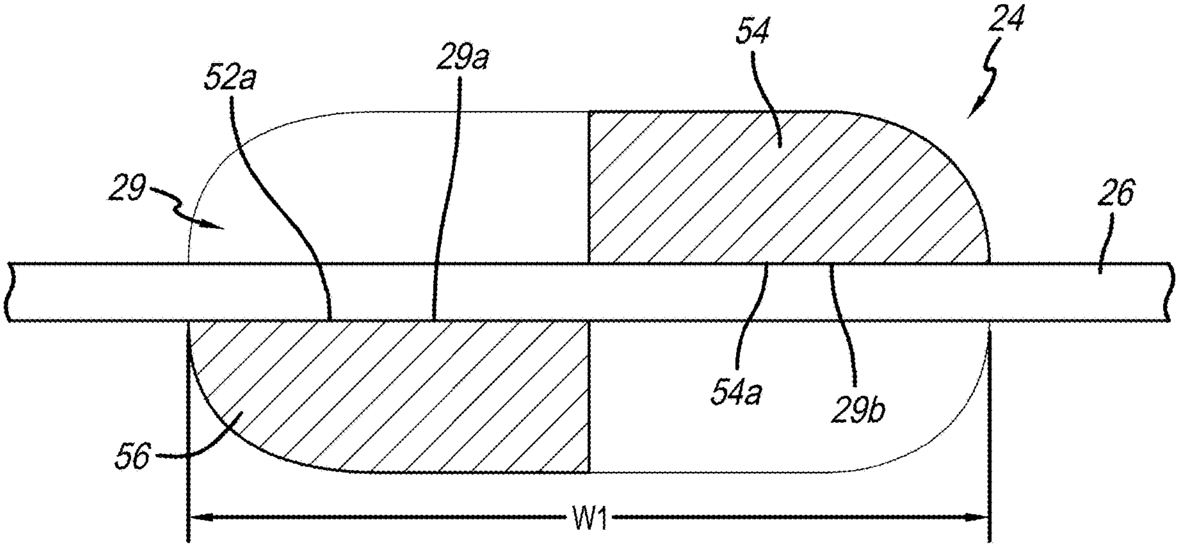
FIG. 31 is a cross-sectional end view of the second arm of the U-shaped portion showing another embodiment of the present invention.
Figure 32:
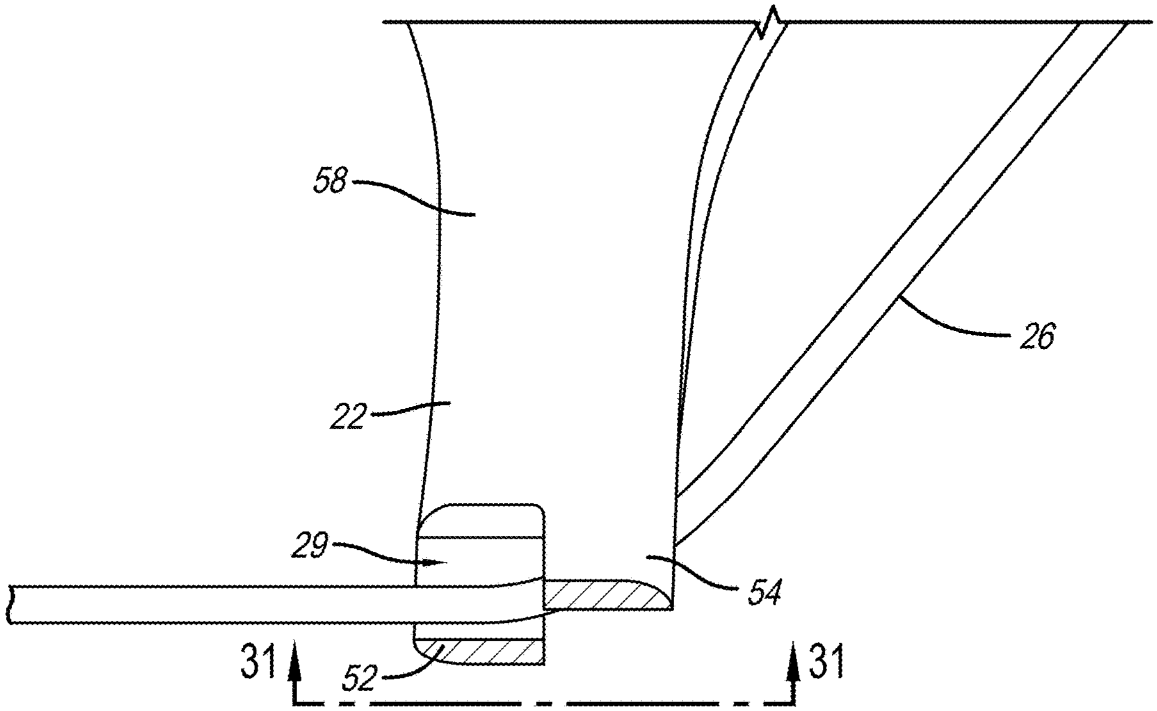
FIG. 32 is a cross-sectional perspective view of the second arm of the U-shaped portion of FIG. 31.
Figure 33:
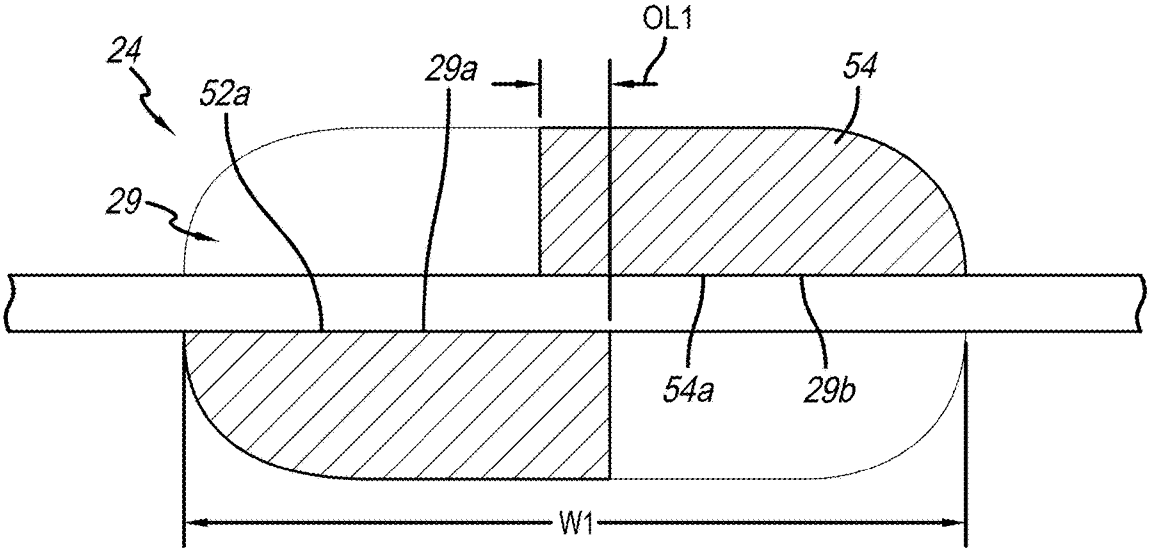
FIG. 33 is a cross-sectional end view of the second arm of the U-shaped portion showing another embodiment of the present invention.

The U-shaped portion includes first and second side surfaces 12*a* and 12*b*. The second arm 24 includes a main portion 58 and an end portion 60 and the channel 29 is defined between the main portion 58 and the end portion 60. With the orientation shown in the figures, the top of the channel 29 is defined by the main portion 58 and the bottom of the channel 29 is defined by the end portion 60. The sides of the channel 29 are defined by two or more prong members. FIGS. 26-29 show three prong members (first prong member 52, second prong member 54 and third prong member 56). FIGS. 31-33 show two prong members (first prong member 52 and second prong member 54). Any number of prong members is within the scope of the invention. As shown in FIGS. 26-29, the first prong member 52 extends between the main portion 58 and the end portion 60 and includes an inner surface 52*a* that at least partially defines a first side of the channel 29*a*, the second prong member 54 extends between the main portion 58 and the end portion 60 and includes an inner surface 54*a* that at least partially defines a second side of the channel 29*b*, and the third prong member 56 extends between the main portion 58 and the end portion 60 and includes an inner surface 56*a* that at least partially defines the first side of the channel 29*a*. More than three prongs members may be included.

Figure 26:
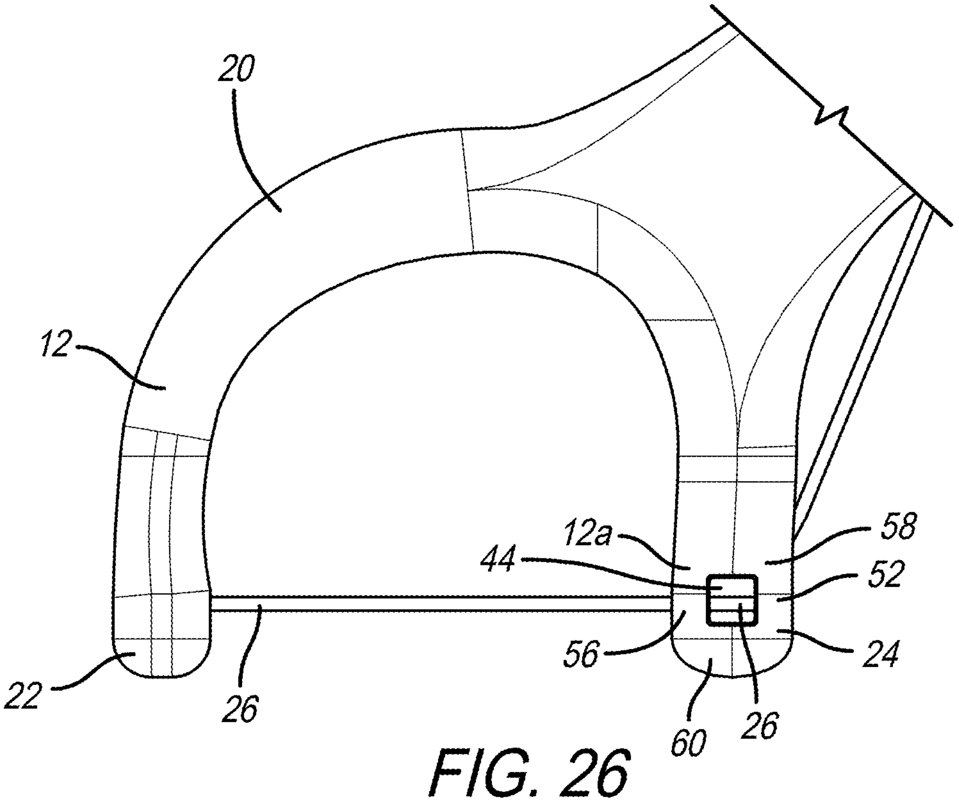
FIG. 26 is an elevational view of a portion of the flosser assembly.
Figure 28:
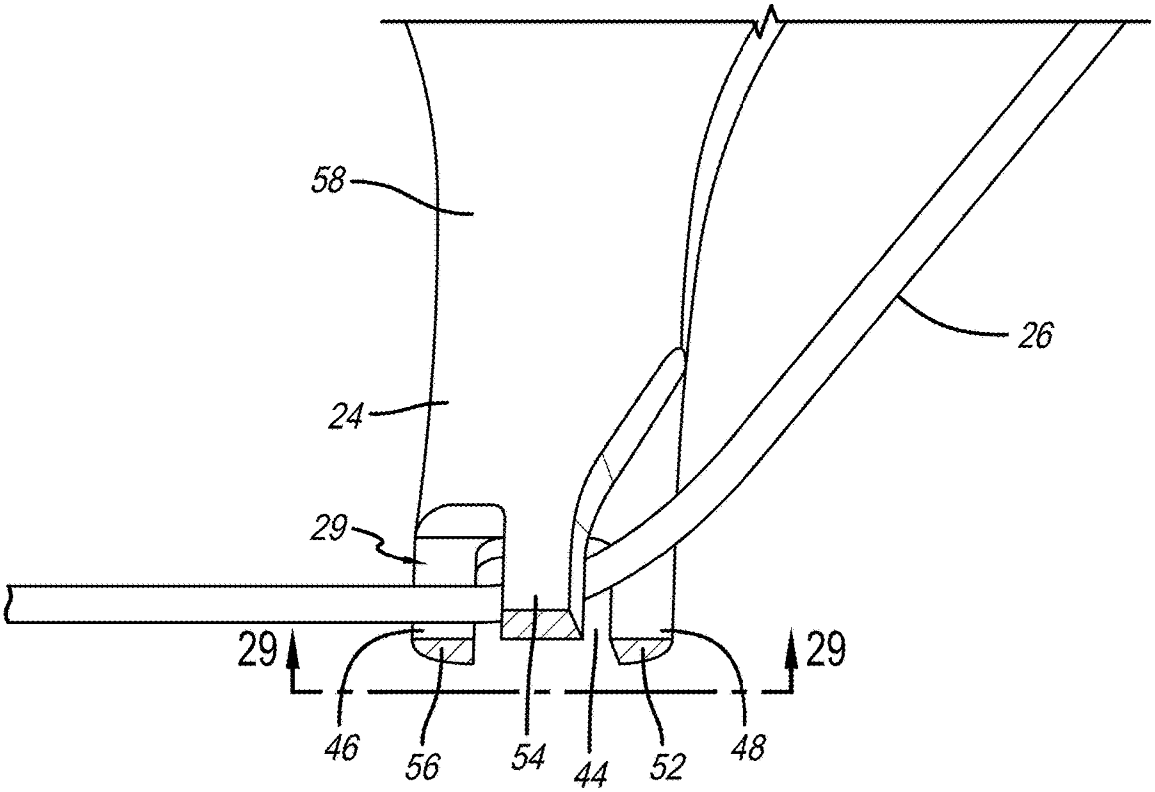
FIG. 28 is a cross-sectional perspective view of the second arm of the U-shaped portion.

As shown in FIG. 26, the first and third prong members may at partially define a window 44 that is defined from the first side surface 12*a* to the channel 29. As shown in FIG. 26, the floss strand 26 is exposed to an exterior of the first side surface 30*c* of the dental flosser 30 through the window 44. FIG. 28 shows the end of the second arm 24 in cross-section and includes the window 44.

Figure 27:
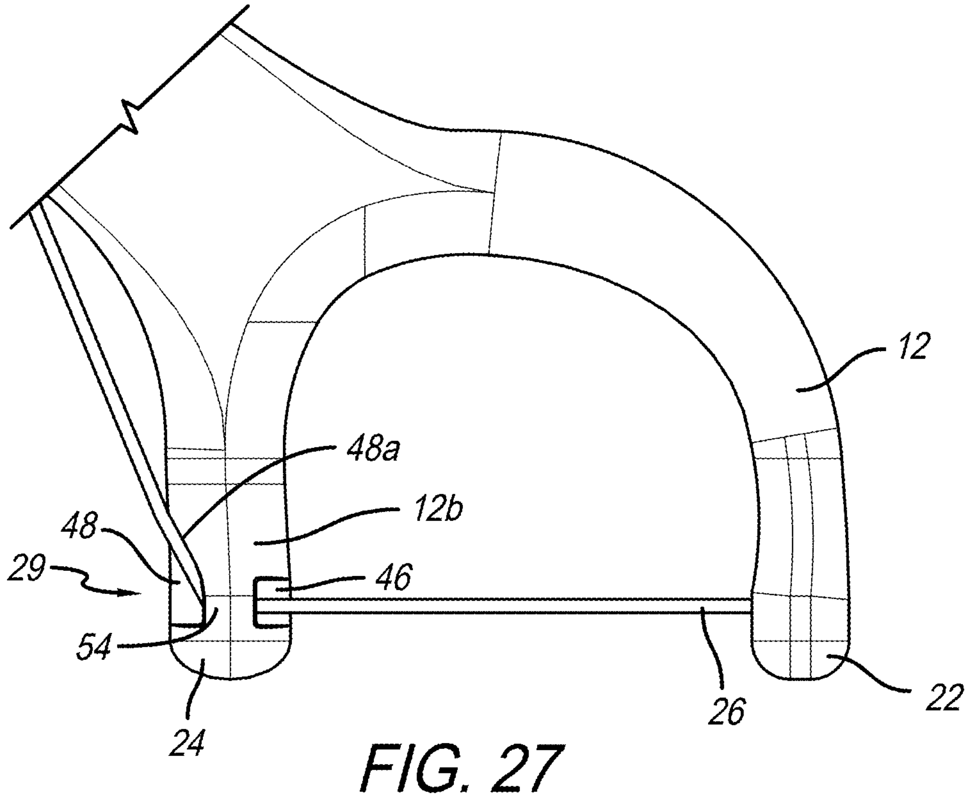
FIG. 27 is an elevational view of a portion of the flosser assembly showing the opposite side of FIG. 26.
Figure 29:
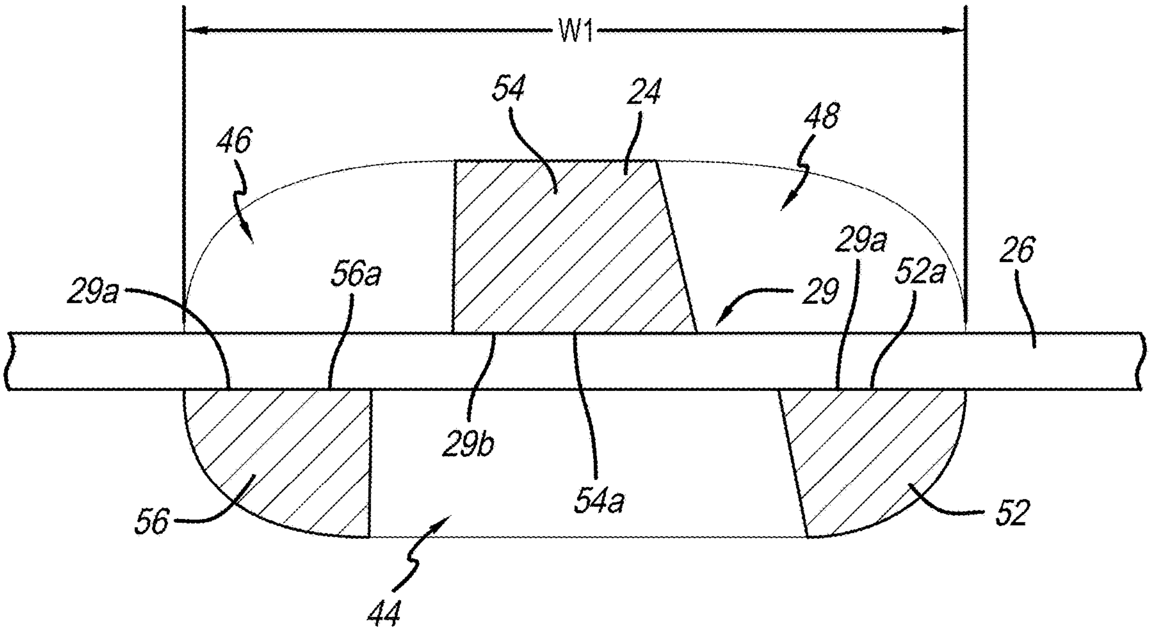
FIG. 29 is a cross-sectional end view of the second arm of the U-shaped portion.

The second arm 24 may also include a first notch 46 and a second notch 48 that are at least partially defined by the second prong member 54 and that are defined from the second side surface 12*b* of the U-shaped portion 12 to the channel 29. As shown in FIG. 27, the floss strand 26 is exposed to an exterior of the second side surface 12*b* of the U-shaped portion through the first and second notches 46 and 48. Preferably, the second notch includes an inclined edge 48*a*. A portion of the floss strand 26 extends upwardly through the channel 29 along the inclined edge 48*a* and to the floss strand attachment member 16. FIG. 29 shows a cross-section viewing the second arm 24 from the bottom. FIG. 29 is viewing the end of the cut of the second arm shown in FIG. 28 and shows how the floss strand 26 extends through the channel 29 and includes the first, second and third prong members 52, 54 and 56, window 44, first notch 46 and second notch 48. It will be appreciated that because the floss strand 26 has less contact area with the plastic of the second arm when extending through the channel that includes the window and/or the notches, the floss strand may slide easier due to the reduced surface area that the floss strand is contacting. As shown in FIGS. 28-29, the floss strand 26 is only contacting an interior surface of the channel 29 on one side at a time (i.e., first side 29*a* of the channel 29 and second side 29*b* of the channel 29*b*) with this arrangement. The channel 29, window 44 and first and second notches 46 and 48 may be at least partially defined by the first prong member 52, second prong member 54 and third prong member 56. The first, second and third prong members extend from the main portion 58 of the second arm 24 to the end portion 60 of the second arm. As shown in FIGS. 28-29, the second prong member 54 may be staggered with respect to and between the first prong member 52 and the third prong member 56. The first and third prong members 52 and 56 are located on one side of the floss strand 26 and the second prong member 54 is located on the opposite side of the floss strand 26. This allows contact of the floss strand with the inside surface of only one of the prong members at a time, as is best shown in FIG. 29 (see inner surfaces 52*a*, 54*a* and 56*a* of first, second and third prong members 52, 54 and 56, respectively). There may some overlap of the second prong member with one or both of the first and third prong members (in a thickness direction), as discussed below.

Figure 30:
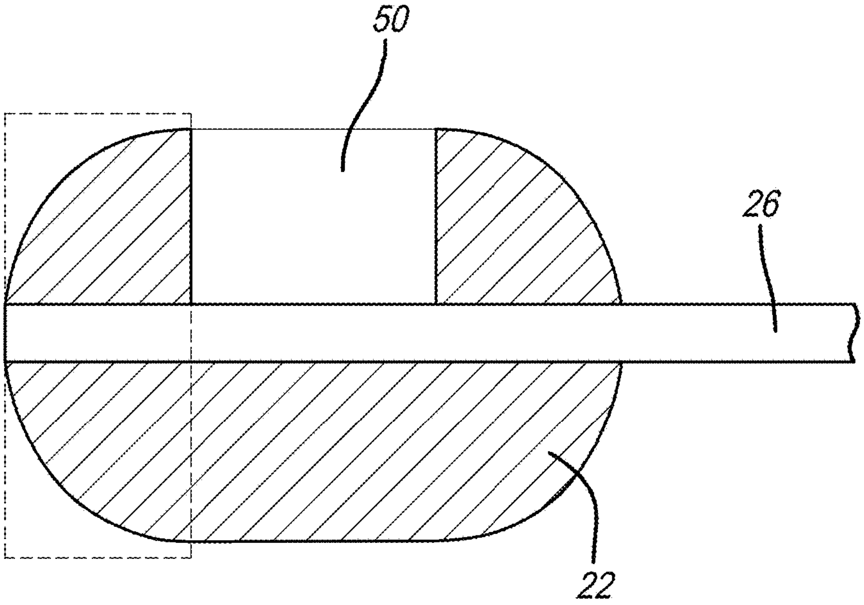
FIG. 30 is a cross-sectional end view of the first arm of the U-shaped portion.

FIG. 30 shows a similar cross-section as FIG. 29, but of the first arm 22 in which the floss strand 26 is embedded or fixed. In this embodiment, the first arm 22 includes a window 50 defined from the first side surface to the floss strand 26, and the floss strand 26 is exposed to the exterior of the first side surface of the dental flosser through the window 50 in the first arm 22. The window may be a notch. In this embodiment, because the floss strand 26 is fixed in the material of the first arm 22, it is required that there is material on both sides of the floss strand along at least a portion of the width of the first arm (as is shown by the dashed box in FIG. 30). However, it will be appreciated that the remainder of the floss strand may be exposed to at least one of the first or second side surfaces of the U-shaped portion or first arm through a window or notch. In other words, this embodiment works as long as there is a portion of the floss that has plastic or material on both sides (see the dashed box) to keep the burned floss bead from sliding through.

In another embodiment, the channel that allows the floss strand to move may be omitted and both arms may include the floss strand embedded therein and also each include a window or notch defined therein that extends to the floss strand and exposes the floss strand to the exterior. This, for example, can be used on a traditional flosser where the floss strand tension is not adjustable. The window and/or notches arrangement can also be utilized with traditional flossers, as discussed further below with respect to FIGS. 34-36.

FIGS. 31-33 show an embodiment with first and second prong members 52 and 54. First prong member 52 includes an inner surface 52*a* that at least partially defines a first side of the channel 29 and the second prong member 54 includes an inner surface 54*a* that at least partially defines a second side of the channel. FIGS. 31 and 32 show an embodiment where the first and second prong members 52 and 54 (and the inner surfaces thereof) or the first side 29*a* of the channel 29 and second side 29*b* of the channel 29*b* do not overlap or do not oppose one another along any portion of the channel 29 or the width W1 of the second arm 24. FIG. 33 is a cross-section taken along the same line as FIG. 31 and shows an embodiment where the first and second prong members 52 and 54 (and the inner surfaces thereof) overlap or oppose one another over only a small portion of the channel 29 or the width W1 of the second arm 24. The OL1 dimension shown in FIG. 33 represents the portion of the inner surfaces 52*a* and 54*a* of the first and second prong members 52 and 54 that oppose one another and may be referred to herein as the opposing overlap or opposing overlap portion. Any amount of opposing overlap is within the scope of the present invention. In a preferred embodiment, the opposing overlap is between 0% and 50%, in a more preferred embodiment, the opposing overlap is between 0% and 25%, in an even more preferred embodiment, the opposing overlap is between 0% and 10%, and in the most preferred embodiment, the opposing overlap is 0%. It will be appreciated that in an embodiment with more than one prong member on the same side of the channel (e.g., the embodiment shown in FIG. 28), the width of the prong members are combined when comparing the opposing overlap to the one or more prong members on the opposite side. In other words, the opposing overlap may be defined by the total overlap between the first side 29*a* of the channel 29 and second side 29*b* of the channel 29*b*. FIG. 29 shows 0% opposing overlap between the first and third prong members 52 and 56 with respect to the second prong member 54.

Figure 34:
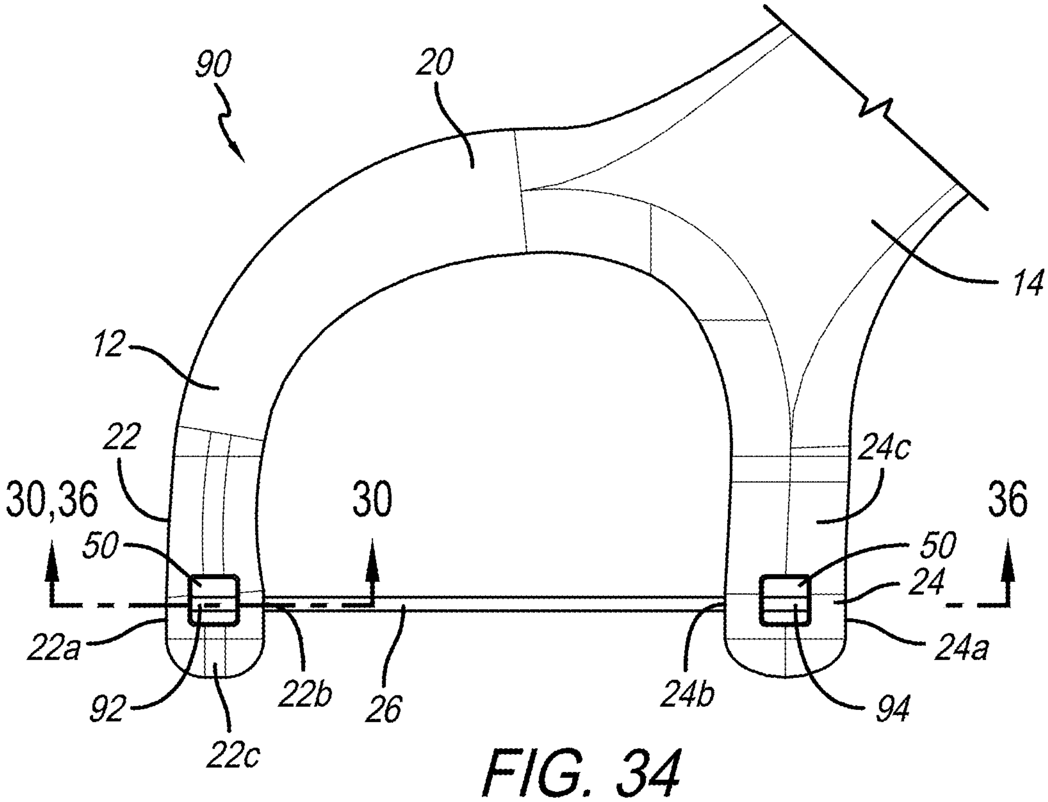
FIG. 34 is an elevational view of a portion of a flosser assembly with the floss strand fastened to both the first and second arms.
Figure 35:
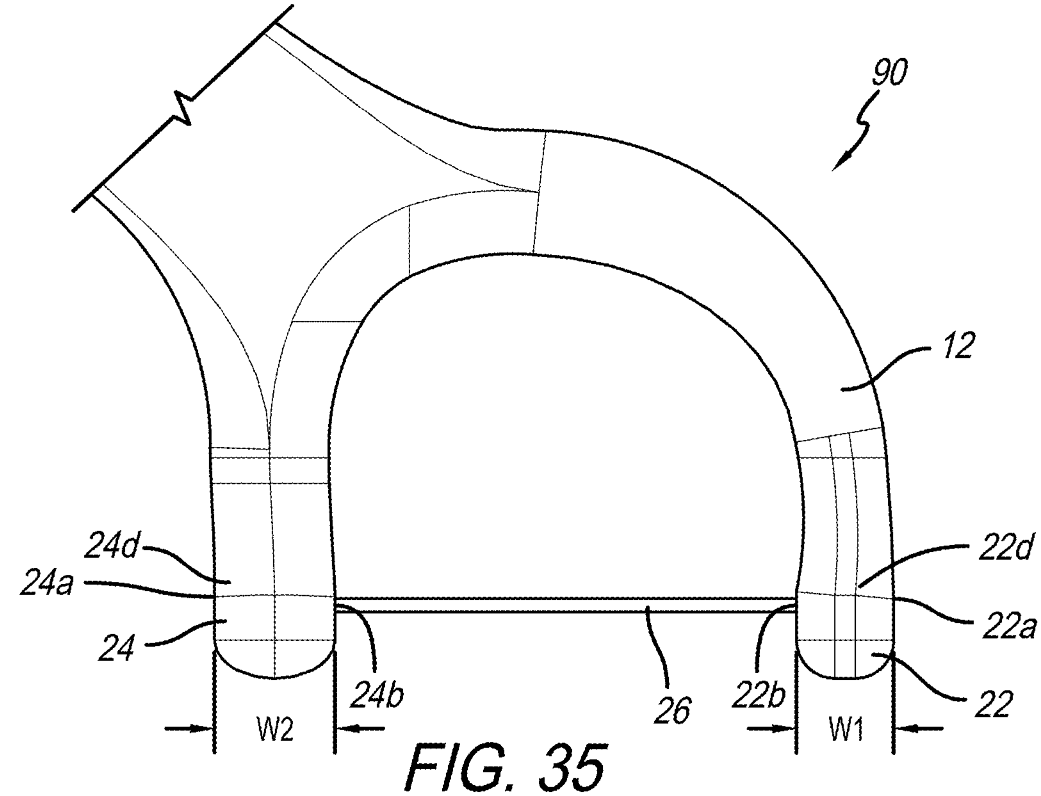
FIG. 35 is an elevational view of a portion of the flosser assembly showing the opposite side of FIG. 34.
Figure 36:
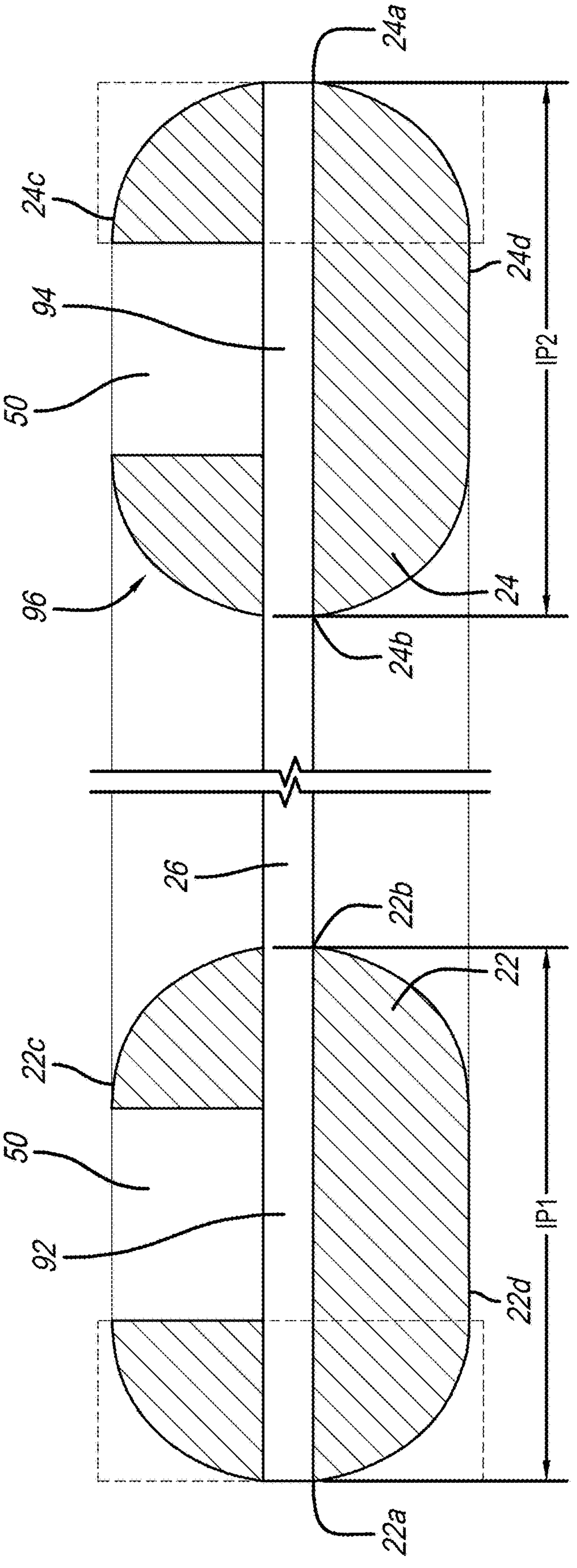
FIG. 36 is a cross-sectional view of the end of the first and second arms.

FIGS. 34-36 show a portion of a dental flosser 90 that includes the floss strand 26 fixed, connected or secured within or to both of the first and second arms 22 and 24 of the U-shaped portion 12. The first arm 22 includes an outer surface 22*a*, an inner surface 22*b* and first and second opposing side surfaces 22*c* and 22*d*. The first arm defines a first arm width W1 between the inner surface 22*b* and the outer surface 22*a*. The second arm 24 includes an outer surface 24*a*, an inner surface 24*b* and first and second opposing side surfaces 24*c* and 24*d*. The second arm 24 defines a second arm width W2 between the inner surface 24*b* and the outer surface 24*a*. The floss strand 26 has a first end 26*a* and a second end 26*b*. The first end 26*a* is fastened, connected or secured to the first arm 22 and the second end 26*b* is fastened, connected or secured to the second arm 24. The first and second ends 26*a* and 26*b* may be embedded in the material of the first and second arms and/or there may be a bead at each of the first and second ends that is embedded in the outer surface 22*a*, 24*a* or just outside thereof.

As shown in FIG. 36, a first inner portion 92 of the floss strand 26 extends through the inner surface 22*b* of the first arm 22 and toward or to or through the outer surface 22*a* of the first arm 22. The first inner portion 92 has a first length IP1. The first inner portion 92 may be exposed through at least one of the first and second opposing side surfaces 22*c* and 22*d* of the first arm 22 along a portion of the first length IP1. This is shown in FIG. 36 where a portion of the first inner portion 92 is exposed through the first side surface 22*c* of the first arm 22 through window 50. Exposed means that the floss strand (or the inner portion thereof) is exposed to air through the side surface.

As is also shown in FIG. 36, a second inner portion 94 of the floss strand 26 extends through the inner surface 24*b* of the second arm 24 and toward or to or through the outer surface 24*a* of the first arm 24. The second inner portion 94 has a second length IP2. The second inner portion 94 may be exposed through at least one of the first and second opposing side surfaces 24*c* and 24*d* of the second arm 24 along a portion of the length IP2. This is shown in FIG. 36 where a portion of the second inner portion 94 is exposed through the first side surface 24*c* of the second arm 24 through a notch 96. It will be appreciated that more than one window or more than one notch may be included to expose different portions of the first and second inner portions 92 and 94. This may also include prong members like those described above.

It will be appreciated that using the first arm 22 as an example, there is a portion of the first length IP1 of the first inner portion 92 where there is material on both sides of the floss strand 26, as is shown by the dashed box in FIG. 36. This portion may be referred to herein as the anchor portion and allows the floss strand 26 to remain secured to or within the first arm. A dashed box is also shown on the second arm 24 to show the anchor portion of the second arm.

It will be appreciated by those of ordinary skill in the art that the various prong members, windows, notches, opposing overlap, etc. described herein (and in FIGS. 26-36) may be advantageous in the injection molding process. In manufacturing the dental flosser, a single injection molding process may be used. Furthermore, with the provision of the prong members, window(s) and/or notches (and the less surface area in contact with the floss strand, as discussed above), the temperature used in the injection molding process can be higher. This allows the use of different materials or plastics (compared to traditional flossers) that may be advantageous, such as biodegradable plastics or other plastics with better properties than are used with traditional flossers. The fixed ends of the arms of the U-shaped portion of traditional flossers do not allow the higher injection molding temperatures, as discussed herein.

It will be appreciated that the exact temperature used in an injection molding process is dependent on many factors, such as injection pressure, flow rate, mold design, etc. In manufacturing a traditional flosser, the injection molding temperature is often capped at 180° C. to not melt the UHMWPE floss material. All else being equal (e.g., injection pressure, flow rate, mold design, etc.), the injection temperature may be 20-30° C. higher without melting the floss by using the non-opposing side surfaces or prong members, windows, notches, etc. discussed herein where at least a portion of the floss is exposed to the outside of the arm(s). Higher injection temperatures also have benefits such as lower injection pressure, faster cycle times, and makes the injection process easier for materials with higher melting points like HIPS and PLA, which is biodegradable.

FIGS. 37-43 show another preferred embodiment of a dental flosser 66 that includes a U-shaped portion 12 having a first arm 22 and a second arm 24 spaced apart from each other and includes a slide member or floss strand attachment member 16 that is movable along the handle portion 14. Many of the components of dental flosser 66 are similar to those of other embodiment discussed herein and, therefore, a discussion of these components is omitted here.

Figure 37:
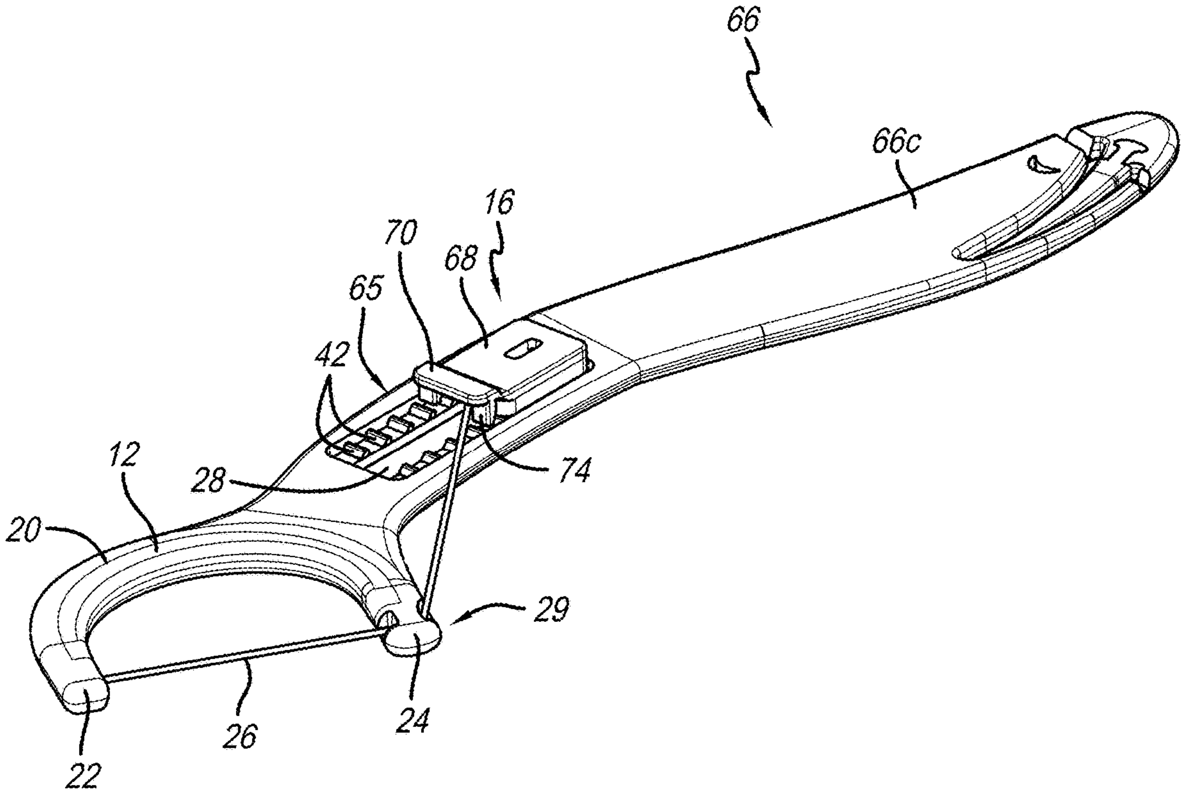
FIG. 37 is a perspective view of a dental flosser in accordance with another preferred embodiment of the present invention.

As shown in FIG. 37, the dental flosser 66 preferably includes a floss strand attachment member 16 associated with and movable with respect to the handle portion 14. The dental floss strand 26 is attached, secured or otherwise connected to the floss strand attachment member 16. The floss strand attachment member 16 is movable between a plurality of positions to increase or decrease the tension of the floss strand. Preferably, the floss strand attachment member 16 is movable between at least a first position and a second position. When the floss strand attachment member 16 is moved toward the proximal end 14*a* of the handle portion 14 the tension of the floss strand is increased. FIG.

37 shows the floss strand attachment member 16 in the rear most or proximal most position.

In a preferred embodiment, the floss strand attachment member 16 includes a main body portion 68 and a contact member 70 that are connected by a living hinge 72. The contact member 70 includes at least one and preferably first and second arms 74 extending toward the first side surface 14*c* handle portion 14. The contact member 70 and first and second arms 74 are movable or pivotable together between a disengaged position (see FIG. 41) and an engaged position (see FIG. 42). The handle portion 14 includes a groove or slot 28 defined therethrough. The dental flosser includes a top surface 66*a*, a bottom surface 66*b* and opposing first and second side surfaces 66*c* and 66*d*. The slot 28 is defined through the handle portion from the first side surface 66*c* to the second side surface 66*d*.

In a preferred embodiment, the handle portion 14 includes a plurality of teeth 42 or a plurality of sets of teeth 42 extending outwardly therefrom. FIG. 37 shows the teeth inset within a trough 65. However, the trough may be omitted and the inside surface of the trough is from which the teeth 42 extend is considered part of the first side surface 14*c* of the handle portion 14. The teeth 42 help maintain the floss strand attachment member 16 or contact member 70 and/or arms 74 in position when in the engaged position, thereby preventing the floss strand attachment member 16 from moving forwardly or rearwardly or proximally or distally when a user is flossing. Preferably, there is a first row of teeth on one side of the slot 28 and a second row of teeth 42 on the other side of the slot 28. The first arm 74 may be aligned with the first row of teeth and the second arm 74 may be aligned with the second row of teeth. The floss strand may extend between the first and second arms 74, as shown in FIG. 37.

Figure 38:
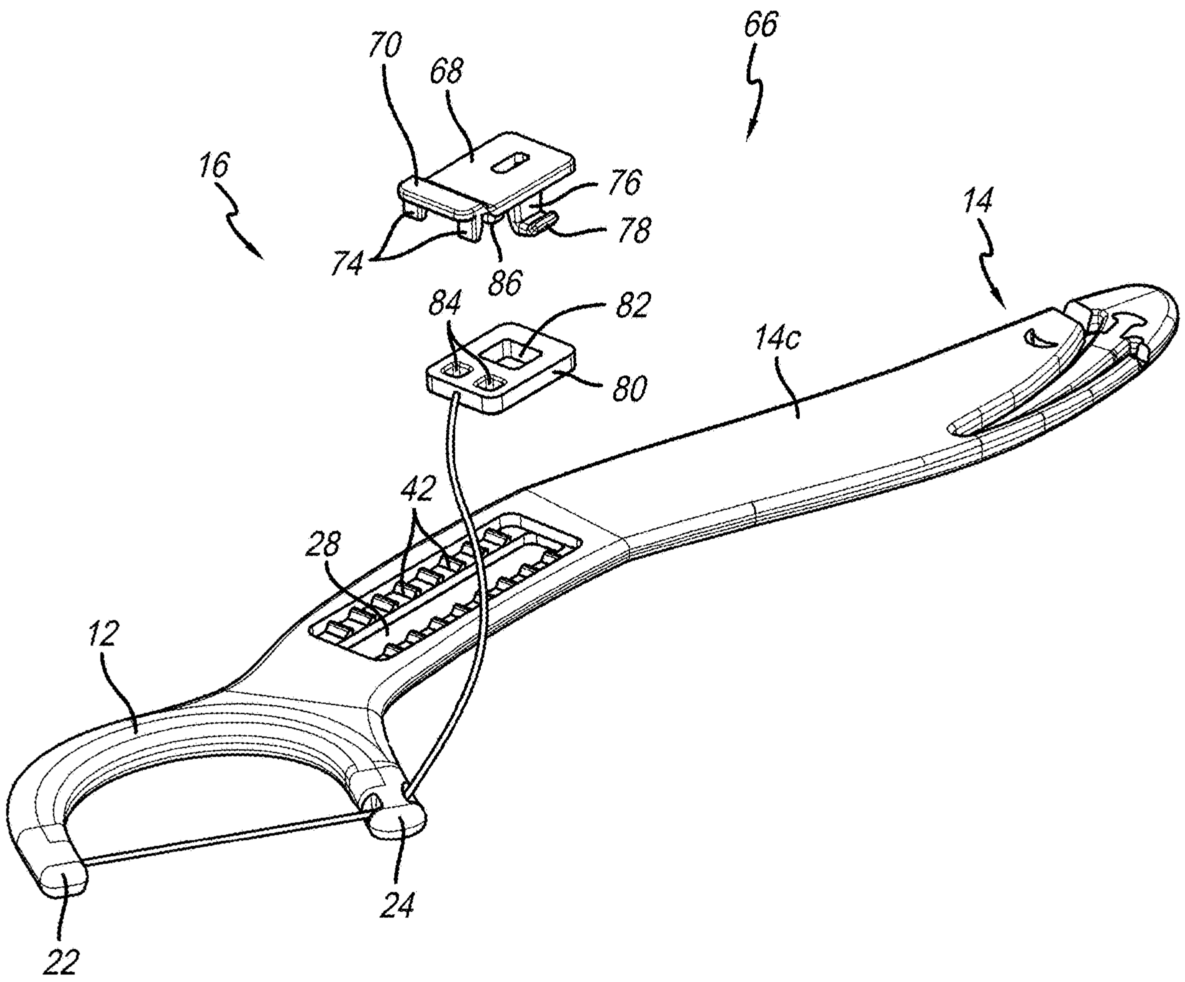
FIG. 38 is an exploded perspective view of the dental flosser of FIG. 37.
Figure 41:
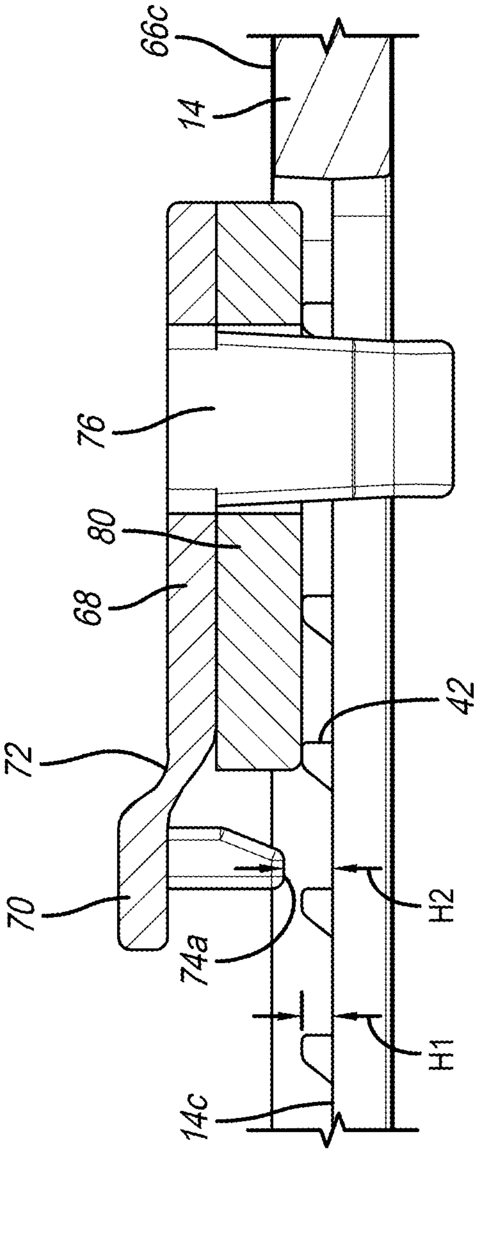
FIG. 41 is a cross-sectional bottom plan view of the slider or floss strand attachment member with the contact member and/or arm in the disengaged position.

The floss strand attachment member 16 preferably includes the contact member 70, main body portion 68 one or more male members 76 and securing members 78 extending from the male members 76. Preferably, at least a portion of the male members 76 extend into the slot 28. This arrangement allows the floss strand attachment member 16 to move proximally and distally. FIG. 38 shows an exploded view of the floss strand attachment member 16, which may include a spacer member 80 that includes a male member opening 82 through which the male members 76 extend and two connection openings 84 that receive two connection members 86 extending from the main body portion 68. As shown in FIG. 41, the spacer member 80 may rest on or contact the top surfaces of the teeth 42. In another embodiment, the spacer member 80 may be omitted and the main body portion may rest on or contact the top surfaces of the teeth 42.

Figure 42:
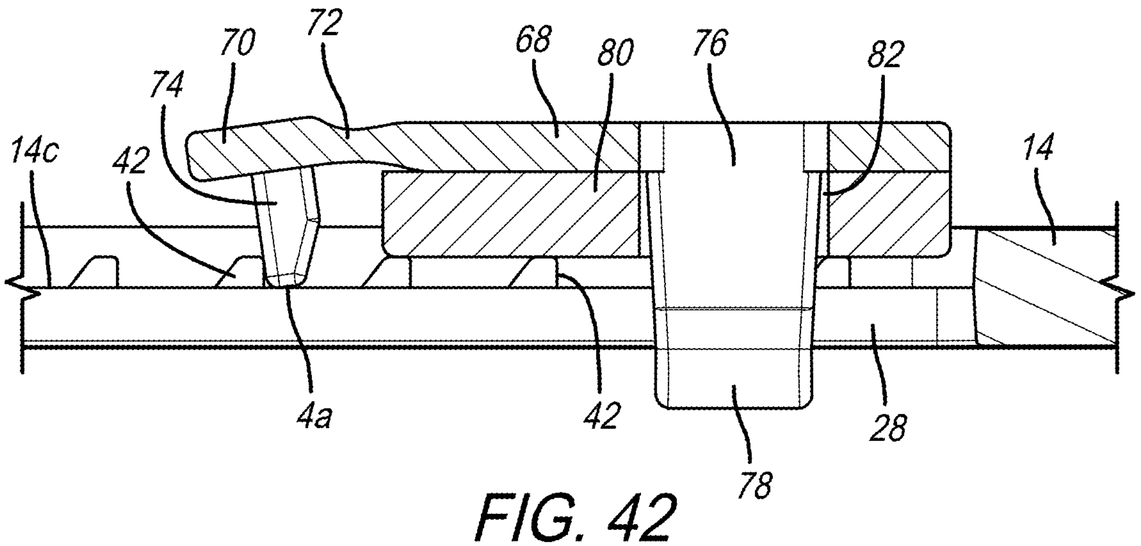
FIG. 42 is a cross-sectional bottom plan view of the slider or floss strand attachment member with the contact member and/or arm in the engaged position.

As shown in FIG. 41, the first and second arms include a contact surface 74*a* at a distal end thereof. A second height H2 is defined between the contact surface 74*a* and the first side surface 14*c* of the handle portion when the first arm 74 is in the disengaged position. The second height H2 is greater than the first height H1. This allows the floss strand attachment member 16 to move proximally and distally when the arms 74 are in the disengaged position. The second height H2 is less than the first height H1 when the first and/or second arms 74 are moved to the engaged position. In other words, in use, the user pushes the contact member 70 and first and second arms 74 inwardly toward the first side surface 14*c* of the handle portion to a position where the contact surface 74*a* is positioned inwardly of the first height H1 so that the arms 74 can be pushed into engagement with a tooth 42, thus locking the floss strand attachment member 16 or slider member in place and maintaining the desired tension on the floss strand so that the user can floss. FIG. 42 shows the engaged position where a user would use the flosser 66 for flossing.

The figures show the contact member 70 and first and second arms 74 pivotable between the disengaged and engaged positions. In another embodiment, the floss strand attachment member 16 may include the ability to move the contact member and/or arms axially or linearly toward the first side surface 66*c*. For example the contact member could be a button or an end of the arm(s) that the user pushes on to move the contact surface 74*a* into a position where it can engage a tooth. It will be appreciated that the teeth may be any surface against which the arm(s) may be engaged to prevent the floss strand attachment member 16 from moving distally and losing the desired tension on the floss.

Figure 39:
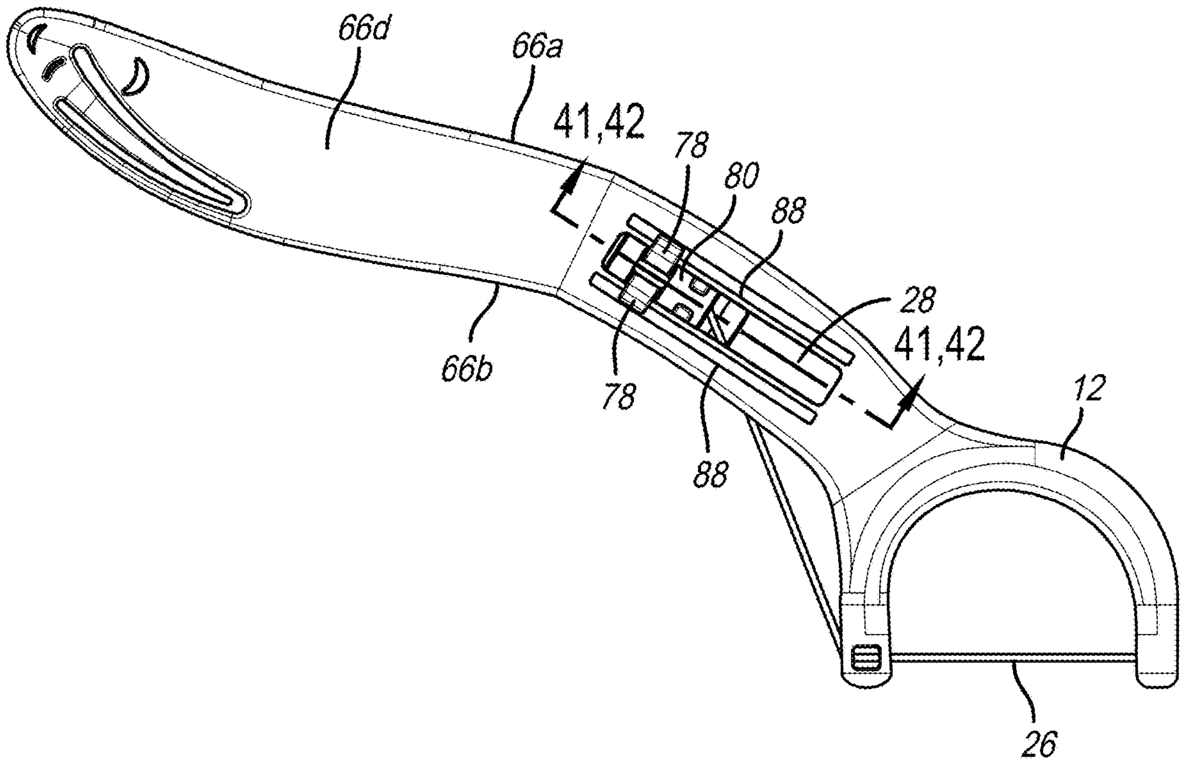
FIG. 39 is a left side elevational view of the dental flosser of FIG. 37.
Figure 40:
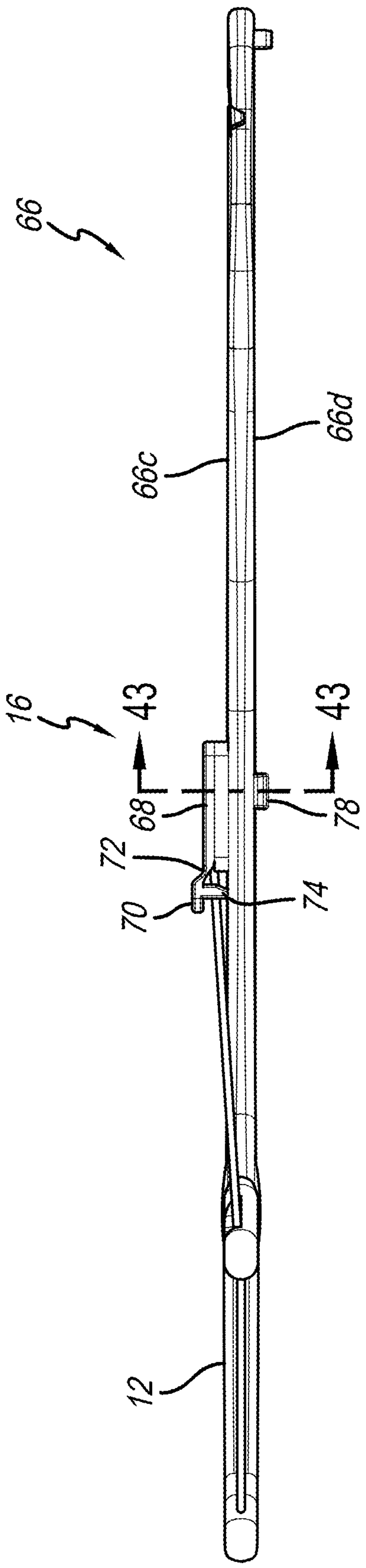
FIG. 40 is a bottom plan view of the dental flosser of FIG. 37.
Figure 43:
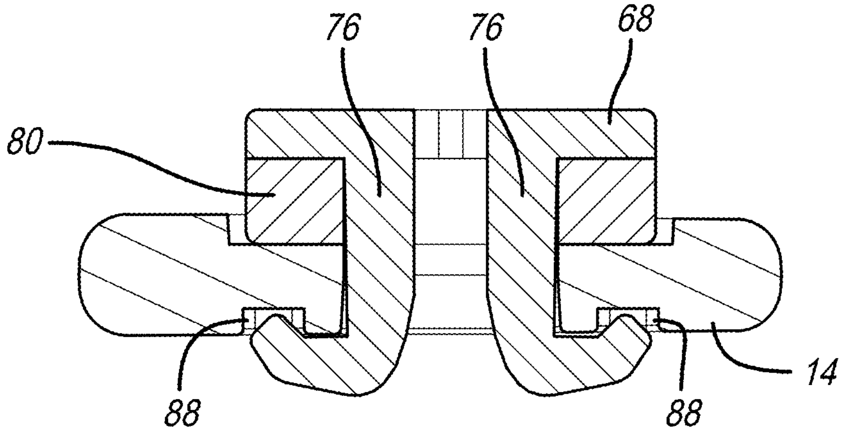
FIG. 43 is a transverse cross-sectional view through the slider or floss strand attachment member.
Figure 44:
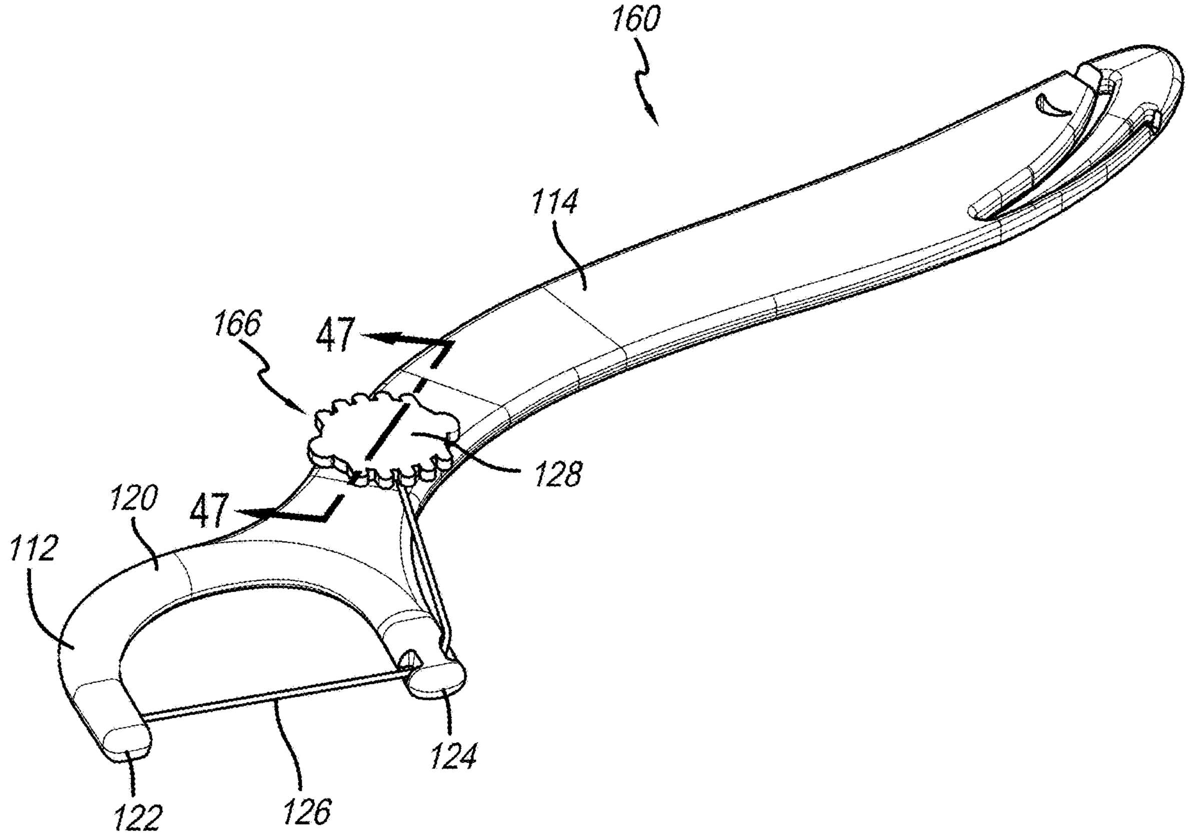
FIG. 44 is a perspective view of a dental flosser in accordance with another preferred embodiment of the present invention.

As shown in FIGS. 39 and 43, the handle portion 14 may include one or more channels 88 defined therein that receive a portion of the securing members 78, such that the floss strand attachment member 16 may move proximally and distally along the handle portion 14.

Figure 45:
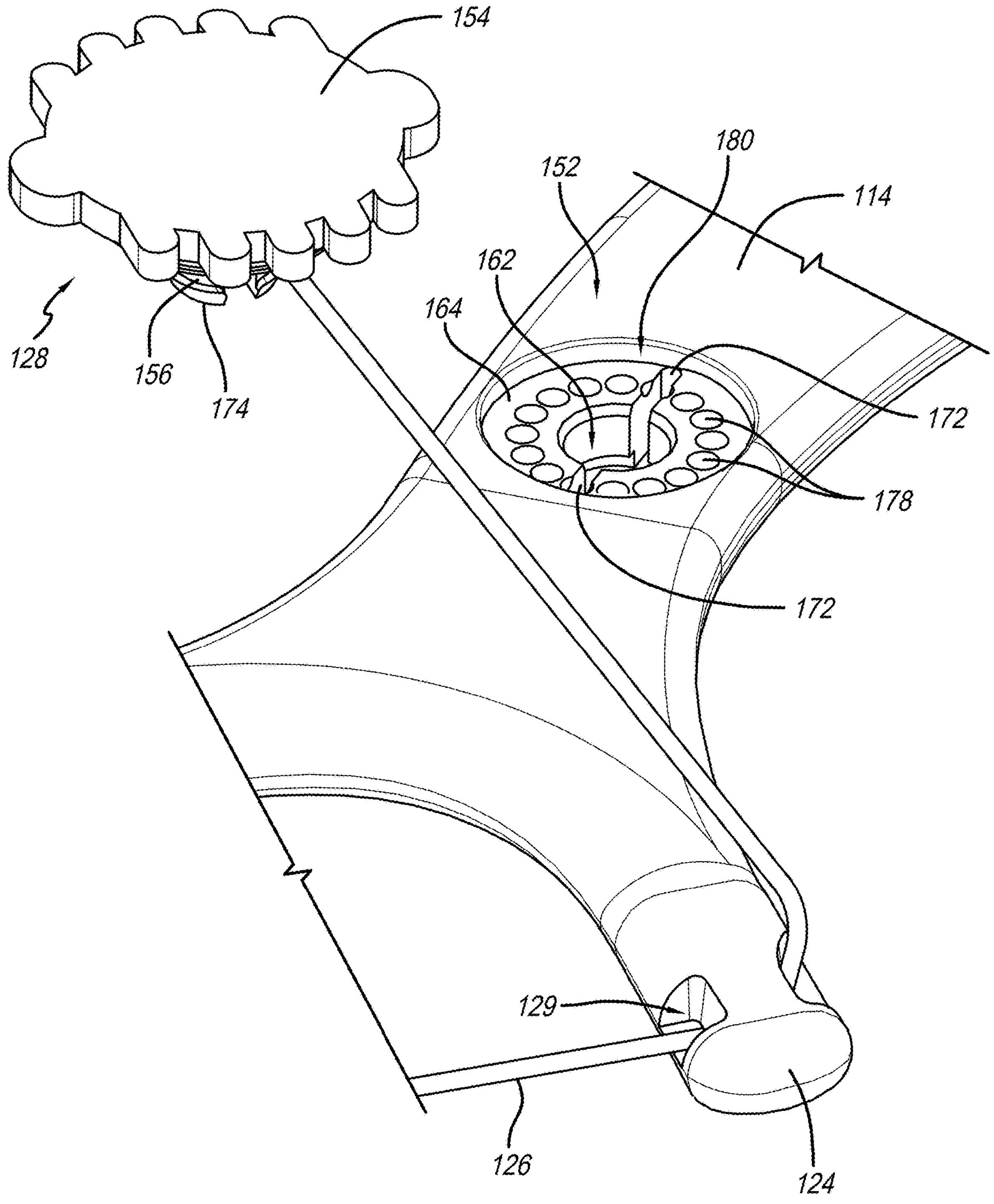
FIG. 45 is an exploded perspective view of a portion of the dental flosser of FIG. 44.

FIGS. 44-47 show a dental flosser 160 according to another example embodiment of the present invention. Dental flosser 160 comprises a U-shaped portion 112, a handle portion 114, and a floss strand attachment member or rotation mechanism 128. U-shaped portion 112 comprises a base 120 and a pair of spaced apart arms (first arm 122 and second arm 124) extending from base 120. Dental flosser 100 comprises a floss strand 126. Floss strand 126 has a first terminal end which is fixedly attached to first arm 122 of U-shaped portion 112. The position of the first terminal end of floss strand 126 does not move relative to first arm 122 of U-shaped portion 112. The first terminal end of floss strand 126 is fixedly attached to an end of first arm 122. Floss strand 126 has a second terminal end which is attached to the rotation mechanism 128. As shown in FIG. 45, floss strand attachment member or rotation mechanism 128 can be separate from handle portion 114, but can also be connectable to a receiver portion 152 on handle portion 114. A user can manipulate rotation mechanism 128 either manually (or mechanically or electronically) to move the second terminal end of floss strand 126 to increase or decrease or maintain tension of the floss strand.

As with other embodiments discussed herein, middle portion of floss strand 126 is slideably mounted on second arm 124 of U-shaped portion 112 such that a middle portion of the floss strand can slide relative to second arm 124 of U-shaped portion 112, such as through a channel 129 at or near the end of second arm 124 of U-shaped portion 112. A middle portion of floss strand 126 can slide through the channel 129 in second arm 124.

Figure 46:
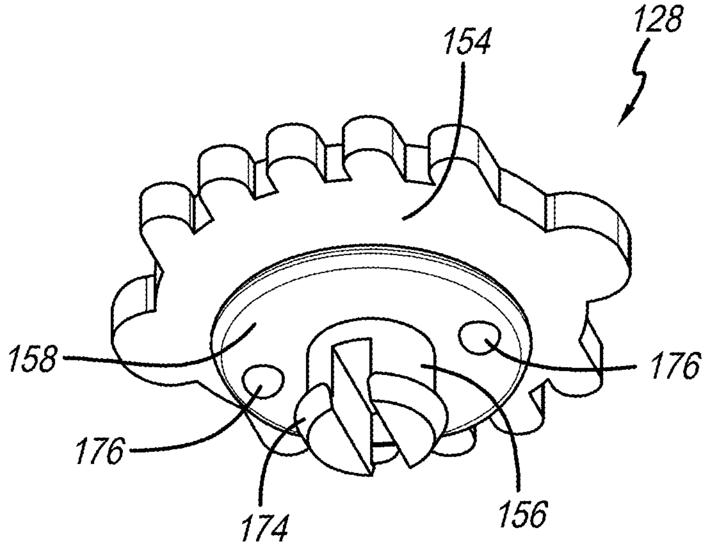
FIG. 46 is a perspective view of the dial member of the dental flosser of FIG. 44.
Figure 47:
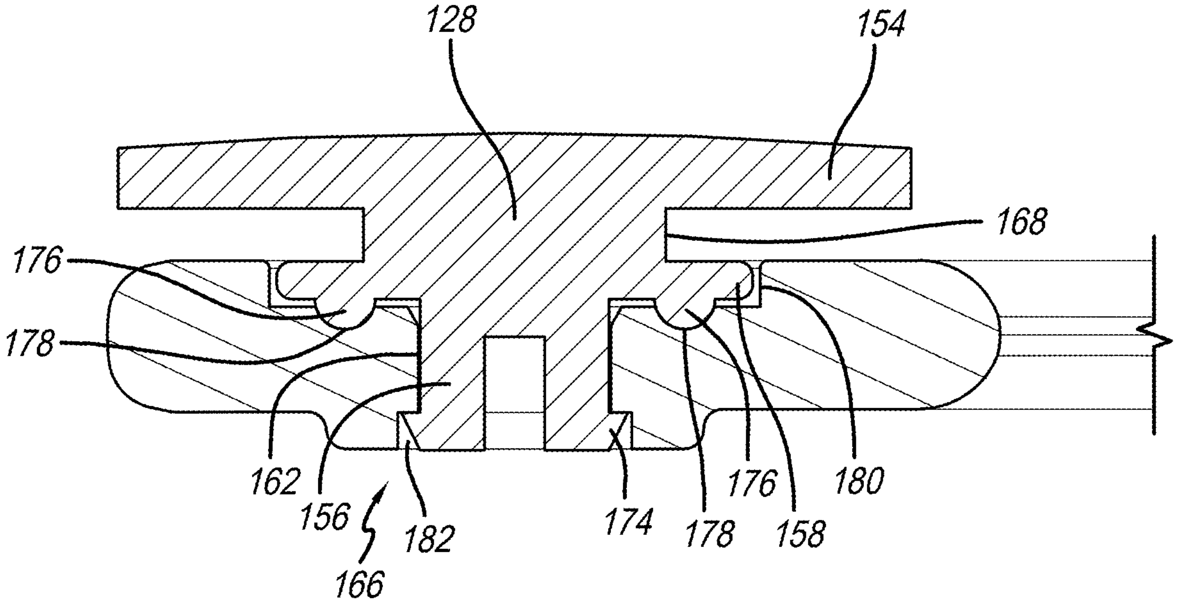
FIG. 47 is a cross-sectional view through the dial member.

Dental flosser 100 may include a rotation assembly 166 that includes rotation mechanism 128 and receiver portion 152. As shown in FIGS. 44-47, rotation mechanism 128 includes dial 154, axle 156, engagement flange 158 and spool portion 168. The second end of the floss strand is attached to the rotation mechanism 128 and preferably the spool portion 168. The receiver portion 152 includes an engagement seat 164 that surrounds a rotation opening 162 that is defined through the handle portion 114. The rotation opening 162 may also be defined through the base 120, which is considered part of the handle portion 114. For example, the entire dental flosser could be U-shaped and the base 120 would be grasped by the user, which is the handle portion 114. In use, the user can rotate rotation mechanism 128 in one direction (e.g., counterclockwise) to increase the tension of floss strand 126. The user can also rotate rotation mechanism 128 in another direction (e.g, clockwise) to decrease the tension of floss strand 126. If needed, the user can also disconnect floss strand attachment member or rotation mechanism 128 from the receiver portion 152 handle portion 114. FIG. 47 shows an enlarged cross-sectional view of rotation assembly 166.

To secure the rotation mechanism 128 on the handle portion 114 or receiver portion 152, the axle 156 is pushed through the rotation opening 162. The axle 156 may include one or more grooves 170 to allow the axle to flex or pinch to fit through the rotation opening 162. The receiver portion 152 may also include one or more grooves 172 in communication with the rotation opening 162 to allow flexing as the axle 156 is pushed through the rotation opening 162. The axle 156 may include a stop member 174 on the end thereof that has a diameter that is larger than the rotation opening 162 to maintain the rotation mechanism 128 rotatably affixed to the handle portion 114. The stop member 174 may be housed in a stop member recess 182 defined in the handle portion 114.

As shown in FIG. 47, in a preferred embodiment, the engagement flange 158, which may be arcuate or circular in shape, includes one or more hemispherical protrusions 176 that are received in complementary hemispherical recesses 178 defined in the engagement seat 164. Preferably, the rotation mechanism 128 includes two protrusions 176 that are arranged 180° from one another (e.g., at 3 and 9 on a clock, as shown in FIG. 46) on the surface of the engagement flange 158 that opposes the engagement seat 164. Preferably, the recesses 178 are circularly arranged about on the engagement seat 164 and surround the rotation opening 162, as shown in FIG. 45. The engagement seat 164 is preferably disposed in a rotation recess 180 defined in the handle portion 114. The rotation mechanism 128 is rotatable between at least a first position and a second position to increase the tension on the floss strand. When the rotation mechanism 128 is rotated, the protrusions 176 move up and out of the recesses 178 in which they are currently disposed or received and then move into the adjacent recess 178 in the rotation direction. The circular arrangement of the recesses 178 together with the two opposing protrusions 176 allows the protrusions to be rotated in either direction. Due to the distance between the engagement flange 158 and the stop member 174 and the thickness of the handle portion 114, the protrusions 176 are maintained in the recess 178. However, due to the flexibility of the material of the engagement flange 158 (e.g., plastic), and the shape of the protrusions and recesses, when the rotation mechanism is rotated, the protrusions 176 slide or ride up and out of the recesses 178 and then are biased into the adjacent recesses 178 in the rotation direction.

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof, means any connection or coupling, either direct or indirect, between two or more elements; the coupling of connection between the elements can be physical, logical, or a combination thereof. Additionally, the words “herein,” “above,” “below,” and words of similar import, when used in this application, shall refer to this application as a whole and not to any particular portions of this application. Where the context permits, words in the above Detailed Description of the Preferred Embodiments using the singular or plural number may also include the plural or singular number respectively. The word “or” in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A dental flosser comprising:

a U-shaped portion having a first arm and a second arm spaced apart from each other, wherein the second arm includes a channel defined therethrough, a handle portion that extends from the U-shaped portion, wherein the handle portion includes a thickness, a top surface, a bottom surface, opposing first and second side surfaces, a proximal end and a distal end, wherein the proximal end is distant from the U-shaped portion, wherein the handle portion defines a longitudinal axis, wherein the handle portion includes a slot defined along the longitudinal axis, and wherein the slot extends through the entire thickness of the handle portion, a floss strand attachment member associated with and movable with respect to the handle portion between at least a first position and a second position, wherein the floss strand attachment member includes a contact member that is adapted to be contacted by a user such that the user can maneuver the floss strand attachment member between the first position and the second position, wherein the contact member is adapted to be pivoted by the user between an engaged position and a disengaged position about a pivot axis while the floss strand attachment member is in the first position or the second position, wherein the floss strand attachment member includes a male member extending from the contact member transverse to the longitudinal axis of the handle portion and defining a transverse axis, wherein the male member extends through the thickness of the handle portion and into the slot along the transverse axis, wherein the pivot axis of the contact member is perpendicular to the transverse axis, and a floss strand having a length and a first end and a second end, wherein the first end of the floss strand is fastened to the first arm and the second end of the floss strand is attached to the floss strand attachment member, wherein a middle portion of the floss strand extends through the channel such that a portion of the floss strand extends between the first and second arms.

2. A dental flosser comprising:

a U-shaped portion having a first arm and a second arm spaced apart from each other, wherein the second arm includes a channel defined therethrough, a handle portion that extends from the U-shaped portion, wherein the handle portion includes a thickness, a proximal end and a distal end, wherein the proximal end is distant from the U-shaped portion, wherein the handle portion defines a longitudinal axis, wherein the handle portion includes a slot defined along the longitudinal axis, wherein the slot extends through the entire thickness of the handle portion, wherein the handle portion includes a first set of teeth that includes a first tooth and a second tooth extending outwardly from a first side surface of the handle portion, wherein the first tooth is positioned on a first side of the slot and the second tooth is positioned on a second side of the slot, wherein the first tooth defines a first height, a floss strand attachment member associated with and movable with respect to the handle portion between at least a first position and a second position, wherein the floss strand attachment member includes a contact member and a male member extending from the contact member transverse to the longitudinal axis of the handle portion and defining a transverse axis, wherein the male member includes a living hinge, wherein the contact member is pivotable about a pivot axis between an engaged position and a disengaged position, wherein the male member extends through the thickness of the handle portion and into the slot along the transverse axis, wherein the pivot axis of the contact member is perpendicular to the transverse axis, wherein the contact member includes a contact surface that contacts the handle portion in the engaged position and is pivoted out of contact with the handle portion in the disengaged position, wherein the contact surface is movable a second height between the engaged position and the disengaged position, wherein the second height is greater than the first height, wherein when the floss strand attachment member is moved from the first position to the second position, a curved or inclined surface on the contact member moves up and over a complementary curved or inclined surface on the first tooth, a floss strand having a length and a first end and a second end, wherein the first end of the floss strand is fastened to the first arm and the second end of the floss strand is attached to the floss strand attachment member, wherein a middle portion of the floss strand extends through the channel such that a portion of the floss strand extends between the first and second arms.

3. The dental flosser of claim 1 wherein the male member includes a living hinge.

4. The dental flosser of claim 3 wherein the contact member includes a contact surface that contacts the handle portion in the engaged position and is pivoted out of contact with the handle portion in the disengaged position, wherein in the disengaged position the contact surface is spaced from the handle portion.

5. The dental flosser of claim 1 wherein the handle portion includes at least a first tooth extending outwardly therefrom, wherein the first tooth defines a first height, wherein the contact surface is movable a second height between the engaged position and the disengaged position, wherein the second height is greater than the first height.

6. The dental flosser of claim 5 wherein the first tooth is part of a first set of teeth that includes the first tooth and a second tooth, wherein the first tooth is positioned on a first side of the slot and the second tooth is positioned on a second side of the slot.

7. The dental flosser of claim 5 wherein when the floss strand attachment member is moved from the first position to the second position, a curved or inclined surface on the contact member moves up and over a complementary curved or inclined surface on the first tooth.

8. The dental flosser of claim 6 wherein the first set of teeth extends outwardly from the first side surface, and wherein a second set of teeth extend outwardly from the second side surface.

9. The dental flosser of claim 2 wherein the handle portion and the U-shaped portion are co-planar and define a first plane that bifurcates the handle portion and the U-shaped portion, wherein the male member defines a first axis, wherein the male member includes a first end that is attached to the contact member and a second end opposite the contact member, and wherein the second end of the male member can extend into the slot and through the first plane such that the first axis is perpendicular to the first plane while the contact member is located outside the slot.

10. The dental flosser of claim 9 comprising a top surface, a bottom surface, and opposing first and second side surfaces, wherein the first set of teeth extends outwardly from the first side surface, and wherein a second set of teeth extend outwardly from the second side surface.

11. The dental flosser of claim 4 wherein the handle portion defines a first plane that bifurcates the handle portion between the first side surface and the second side surface, wherein the male member defines a first axis, wherein the male member includes a first end that is attached to the contact member and a second end opposite the contact member, and wherein the second end of the male member extends into the slot and through the first plane such that the first axis is perpendicular to the first plane while the contact member is located outside the slot.

12. The dental flosser of claim 1 wherein the contact member includes a contact end opposite the contact surface, wherein movement of the contact end toward the handle portion pivots the contact surface away from the handle portion and about the pivot axis.

* * * * *